(12) United States Patent
Mason et al.

(10) Patent No.: US 11,840,164 B2
(45) Date of Patent: *Dec. 12, 2023

(54) CHILD SAFETY SEAT

(71) Applicant: Wonderland Switzerland AG, Steinhausen (CH)

(72) Inventors: Kyle S. Mason, Lititz, PA (US); Andrew Ma, Downingtown, PA (US); David A. Lehman, Lancaster, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,396

(22) Filed: Aug. 4, 2022

(65) Prior Publication Data

US 2022/0371484 A1    Nov. 24, 2022

Related U.S. Application Data

(62) Division of application No. 16/737,030, filed on Jan. 8, 2020, now Pat. No. 11,447,047.

(60) Provisional application No. 62/843,692, filed on May 6, 2019, provisional application No. 62/790,707, filed on Jan. 10, 2019.

(51) Int. Cl.
*B60N 2/28* (2006.01)

(52) U.S. Cl.
CPC .......... *B60N 2/2884* (2013.01); *B60N 2/2863* (2013.01); *B60N 2/2851* (2013.01)

(58) Field of Classification Search
CPC ...... B60N 2/28; B60N 2/2821; B60N 2/2839; B60N 2/2851; B60N 2/2863; B60N 2/2875; B60N 2/2884; B60N 2/62; B60N 2002/2815; B60N 2002/2818
See application file for complete search history.

(56) References Cited

U.S. PATENT DOCUMENTS

| 4,186,962 A | 2/1980 | Meeker |
| 4,480,870 A | 11/1984 | Von |
| 4,688,850 A | 8/1987 | Brownlie et al. |

(Continued)

FOREIGN PATENT DOCUMENTS

| AU | 2017272241 A1 | 6/2018 |
| CN | 101633331 A | 1/2010 |

(Continued)

OTHER PUBLICATIONS

Chinese Application No. 202010024605.X filed Jan. 10, 2020; Chinese Office Action with English Translation dated Nov. 24, 2021; 12 pages.

(Continued)

*Primary Examiner* — James M Ference
(74) *Attorney, Agent, or Firm* — CANTOR COLBURN LLP

(57) ABSTRACT

A child safety seat includes a seat shell for receiving a child, an extension member, an extension locking mechanism operable to lock the extension member with respect to the seat shell, and an anti-rebound part. The anti-rebound part can be installed on the extension member or the seat shell. The child safety seat is installable on a vehicle seat in a rear facing position with the anti-rebound part extending at an angle above the extension member and adjacent to a seatback of the vehicle seat.

17 Claims, 22 Drawing Sheets

(56) References Cited

U.S. PATENT DOCUMENTS

| | | | |
|---|---|---|---|
| 4,729,600 | A | 3/1988 | Single, II et al. |
| 4,743,064 | A * | 5/1988 | Takizawa ............ B60N 2/2821 |
| | | | 297/256.14 |
| 4,913,490 | A | 4/1990 | Takahashi et al. |
| 5,052,750 | A | 10/1991 | Takahashi et al. |
| 5,106,154 | A | 4/1992 | Kain |
| 5,110,182 | A | 5/1992 | Beauvais |
| 5,181,761 | A | 1/1993 | Meeker |
| 5,228,746 | A | 7/1993 | Burleigh |
| 5,462,333 | A | 10/1995 | Beauvais |
| 5,722,720 | A | 3/1998 | Lumley |
| 5,746,478 | A | 5/1998 | Lumley et al. |
| 5,957,531 | A | 9/1999 | Kane et al. |
| 6,139,099 | A * | 10/2000 | Skold ....................... B60N 2/28 |
| | | | 297/250.1 |
| 6,152,525 | A | 11/2000 | Carine et al. |
| 6,170,911 | B1 | 1/2001 | Kassai et al. |
| 6,318,799 | B1 | 11/2001 | Greger et al. |
| 6,347,832 | B2 | 2/2002 | Mori |
| 6,439,660 | B1 | 8/2002 | Guenther |
| 6,554,358 | B2 | 4/2003 | Kain |
| 6,834,915 | B2 | 12/2004 | Sedlack |
| 6,860,557 | B2 * | 3/2005 | Jonasson ................ B60N 3/063 |
| | | | 297/256.16 |
| 7,073,859 | B1 | 7/2006 | Wilson |
| 7,097,245 | B2 * | 8/2006 | Barker .................. B60N 2/2863 |
| | | | 297/256.16 |
| 7,207,628 | B2 | 4/2007 | Eros |
| 7,887,128 | B2 | 2/2011 | Zink et al. |
| 7,901,003 | B2 | 3/2011 | Meeker et al. |
| 8,764,108 | B2 | 7/2014 | Gaudreau, Jr. |
| 9,010,857 | B2 | 4/2015 | Chen |
| 9,073,459 | B2 | 7/2015 | Chen |
| 9,150,126 | B1 | 10/2015 | Kitchens et al. |
| 9,162,593 | B2 | 10/2015 | Spence et al. |
| 9,327,619 | B2 | 5/2016 | Taylor et al. |
| 10,632,871 | B2 | 4/2020 | Schmitz et al. |
| 11,447,047 | B2 * | 9/2022 | Mason .................. B60N 2/2884 |
| 2001/0040398 | A1 | 11/2001 | Wetter |
| 2002/0038968 | A1 | 4/2002 | Maier et al. |
| 2005/0110318 | A1 | 5/2005 | Meeker et al. |
| 2006/0055218 | A1 | 3/2006 | Barker |
| 2008/0030055 | A1 | 2/2008 | Renaudin |
| 2009/0102257 | A1 | 4/2009 | Collias |
| 2009/0322130 | A1 | 12/2009 | Hartenstine et al. |
| 2010/0244519 | A1 | 9/2010 | Dingier et al. |
| 2011/0109138 | A1 | 5/2011 | Inoue et al. |
| 2011/0169310 | A1 | 7/2011 | Keegan et al. |
| 2011/0193382 | A1 | 8/2011 | Gaudreau, Jr. et al. |
| 2013/0320725 | A1 | 12/2013 | Conway |
| 2014/0008955 | A1 | 1/2014 | Spence et al. |
| 2014/0062152 | A1 | 3/2014 | Doolan et al. |
| 2014/0265488 | A1 | 9/2014 | Heisey et al. |
| 2015/0076878 | A1 | 3/2015 | Jane Santamaria |
| 2015/0091348 | A1 | 4/2015 | Juchniewicz et al. |
| 2016/0059747 | A1 | 3/2016 | Pos |
| 2018/0126877 | A1 | 5/2018 | Williams |
| 2019/0077282 | A1 | 3/2019 | Reaves et al. |
| 2020/0223331 | A1 | 7/2020 | Mason et al. |
| 2020/0223332 | A1 | 7/2020 | Ma et al. |
| 2022/0055504 | A1 | 2/2022 | Ma et al. |
| 2022/0371484 | A1 * | 11/2022 | Mason .................. B60N 2/2839 |

FOREIGN PATENT DOCUMENTS

| | | |
|---|---|---|
| CN | 201907438 U | 7/2011 |
| CN | 202152019 U | 2/2012 |
| CN | 102427965 A | 4/2012 |
| CN | 102811884 A | 12/2012 |
| CN | 103419684 A | 12/2013 |
| CN | 103707784 A | 4/2014 |
| CN | 103991393 A | 8/2014 |
| CN | 104709123 A | 6/2015 |
| CN | 205674904 A | 11/2016 |
| CN | 108146303 A | 6/2018 |
| CN | 108657033 A | 10/2018 |
| EP | 1953034 A2 | 8/2008 |
| EP | 2147818 A1 | 1/2010 |
| EP | 2716494 A1 | 4/2014 |
| EP | 2781400 A2 | 9/2014 |
| EP | 2865562 A2 | 4/2015 |
| EP | 2883745 A1 | 6/2015 |
| JP | 2002-29298 | 1/2002 |
| JP | 2007168580 A | 7/2007 |
| JP | 2007-283781 | 11/2007 |
| JP | 2007283781 A | 11/2007 |
| RO | 133040 A2 | 1/2019 |
| WO | 2012065479 A1 | 5/2012 |
| WO | 2014000014 A1 | 1/2014 |
| WO | 2015027275 A1 | 3/2015 |

OTHER PUBLICATIONS

Australian Patent Application No. 2020200195; Office Action dated Oct. 23, 2020; 6 pages.
Chinese Application No. 202010025672.3 filed Jan. 10, 2020; Chinese Office Action dated Nov. 25, 2021; 12 pages.
European Application No. 20151140.9 filed Jan. 10, 2020; European Search Reported dated Nov. 13, 2020; 10 pages.
European Application No. 20151140.9 filed Jan. 10, 2020; Partial European Search Reported dated Jun. 5, 2020; 5 pages.
European Application No. 20151264.7-1010/3680128 filed Jan. 10, 2020; European Office Action dated Feb. 2, 2021; 4 pages.
European Application No. 21185340.3-1012 filed Jan. 10, 2020; European Search Report dated Oct. 29, 2021; 5 pages.
Japanese Patent Application No. 2020-002217 filed Jan. 9, 2020; Notice of Allowance dated Nov. 24, 2021; 3 pages.
Office Action of the corresponding JP Patent Application No. 2020-002217 (with English translation) dated Mar. 16, 2021.
Search Report of the corresponding EP Patent Application No. 20151253 dated Aug. 13, 2020.
Search Report of the corresponding EP Patent Application No. 20151264.7 dated Jun. 17, 2020.
Notice of Reasons for Rejection w english translation; CN Application No. 2021-209157; dated Mar. 7, 2023; pp. 1-8.
Australian Office Action for Australian Application No. 2021282423; Report dated Mar. 27, 2023 (pp. 1-4).
Non-Final Office Action for U.S. Appl. No. 17/518,569; filed Nov. 3, 2021; Date of Notification: May 24, 2023; 19 pages.
Australian Office Action for Australian Application No. 2022201233; dated Jul. 10, 2023 (4 Pages).
Japanese Office Action for JP Application No. 2021-209157 with Translation; dated Sep. 12, 2023 (pp. 1-8).
U.S. Final Office Action for U.S. Appl. No. 17/518,569; Office Action dated Sep. 6, 2023 (19 Pages).

* cited by examiner

CHILD SAFETY SEAT

CROSS-REFERENCE TO RELATED APPLICATIONS

This application is a divisional of U.S. patent application Ser. No. 16/737,030, filed Jan. 8, 2020, which claims the benefit of priority to U.S. Provisional application No. 62/790,707, filed on Jan. 10, 2019, and to U.S. provisional application No. 62/843,692 filed on May 6, 2019, all of which are incorporated by reference in their entirety herein.

BACKGROUND

Field of the Invention

The present invention relates to child safety seats.

Description of the Related Art

A child safety seat is typically used in an automobile vehicle to properly restrain a child in the event of accidental collision. Is it widely known that a child safety seat that is placed in a rear facing position can provide better protection, because it can distribute crash forces over a larger portion of the body (i.e., the back supporting the head). Therefore, it is usually recommended to use the child safety seat in the rear facing position as long as possible, until the child reaches the highest weight or height allowed by the seat.

In order to accommodate children of different ages, some child safety seats may have an extension panel that is adjustable to increase or reduce a leg room in the rear facing position. However, the area where the child safety seat is installed in a vehicle may greatly vary in shape and size, and the configuration of the extension panel may not always provide suitable support for preventing undesirable rotation of the child safety seat into the vehicle seat.

Therefore, there is a need for an improved child safety seat that is more flexible in use, and can address at least the foregoing issues.

SUMMARY

The present application describes a child safety seat having an extension member and an anti-rebound part that can be adjusted according to the needs, whereby the child safety seat can offer more flexibility and is safer in use.

According to an embodiment, the child safety seat includes a seat shell for receiving a child, an extension member, an extension locking mechanism operable to lock the extension member with respect to the seat shell, and an anti-rebound part. The seat shell has a backrest, a front end opposite to the backrest, and a seat portion extending between the backrest and the front end. The extension member is disposed adjacent to the front end of the seat shell, is slidably connected with the seat shell and has a forward end, the extension member being slidable relative to the seat shell to increase or reduce a distance between the forward end of the extension member and the front end of the seat shell. The anti-rebound part is installable on and removable from the extension member, the child safety seat being installable on a vehicle seat in a rear facing position with the anti-rebound part restrictedly positioned on the extension member and adjacent to a seatback of the vehicle seat.

According to another embodiment, a child safety seat described herein includes a seat shell for receiving a child, an extension member, an extension locking mechanism operable to lock the extension member with respect to the seat shell, and an anti-rebound part. The seat shell has a backrest, a front end opposite to the backrest, and a seat portion extending between the backrest and the front end. The extension member is disposed adjacent to the front end of the seat shell and is slidably connected with the seat shell, the extension member having a forward end, a transversal portion extending across a width of the seat portion, and two bent portions that are respectively connected with the transversal portion and rise above the transversal portion at a left and a right side of the seat portion, the extension member being slidable relative to the seat shell to increase or reduce a distance between the forward end of the extension member and the front end of the seat shell. The anti-rebound part is carried by the extension member, the child safety seat being installable on a vehicle seat in a rear facing position with the anti-rebound part extending at an angle above the extension member and adjacent to a seatback of the vehicle seat, the anti-rebound part being movable along with the extension member relative to the seat shell.

According to another embodiment, a child safety seat described herein includes a seat shell for receiving a child, an extension member, an extension locking mechanism operable to lock the extension member with respect to the seat shell, and an anti-rebound part. The seat shell has a backrest, a front end opposite to the backrest, and a seat portion extending between the backrest and the front end. The extension member is disposed adjacent to the front end of the seat shell and is slidably connected with the seat shell, the extension member having a forward end, the extension member being slidable relative to the seat shell to increase or reduce a distance between the forward end of the extension member and the front end of the seat shell. The anti-rebound part is carried by the extension member and has a distal end, the child safety seat being installable on a vehicle seat in a rear facing position with the anti-rebound part extending above the extension member and adjacent to a seatback of the vehicle seat, the distal end of the anti-rebound part being positioned adjacent to the forward end of the extension member when the anti-rebound part is stowed in a first angular position relative to the extension member and displaced away from the forward end of the extension member when the anti-rebound part is deployed to a second angular position that is tilted at an angle relative to the first angular position.

Yet according to another embodiment, a child safety seat described herein includes a seat shell for receiving a child, an extension member, an extension locking mechanism operable to lock the extension member with respect to the seat shell, and an anti-rebound part. The seat shell has a backrest, a front end opposite to the backrest, and a seat portion extending between the backrest and the front end. The extension member is disposed adjacent to the front end of the seat shell, the extension member being slidably connected with the seat shell and having a forward end, the extension member being slidable relative to the seat shell to increase or reduce a distance between the forward end of the extension member and the front end of the seat shell. The anti-rebound part is connected with the seat shell, the child safety seat being installable on a vehicle seat in a rear facing position with the anti-rebound part extending at an angle above the extension member and adjacent to a seatback of the vehicle seat.

DETAILED DESCRIPTION OF THE EMBODIMENTS

Figure 1:
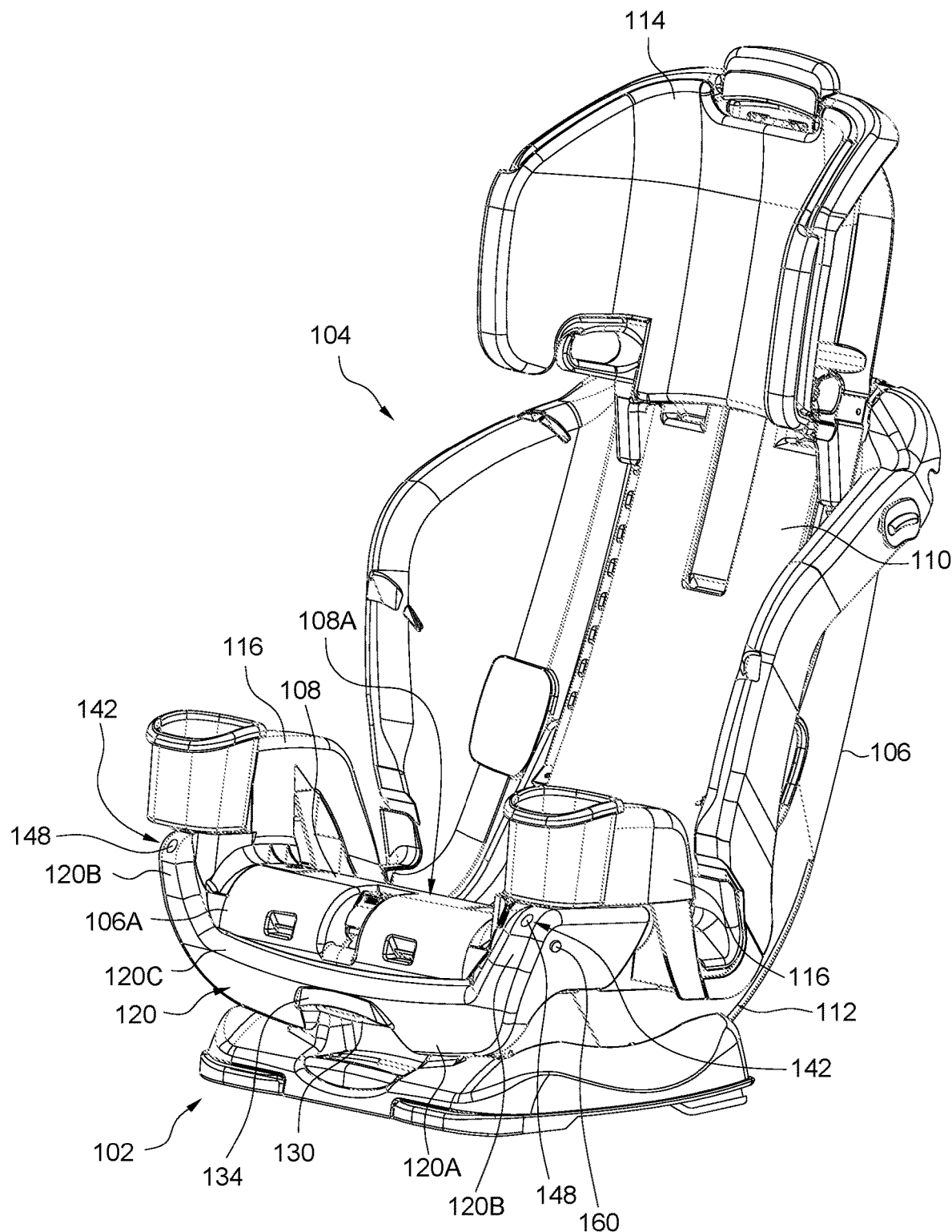
FIG. 1 is a perspective view illustrating an embodiment of a child safety seat.

FIG. 1 is a perspective view illustrating an embodiment of a child safety seat 100 suitable for seating a child in a vehicle. The child safety seat 100 can include a base 102, and a child carrier 104 that can be detachably installed on the base 102. The base 102 can provide stable support for the child carrier 104, and also allow recline adjustment of the child carrier 104. The child carrier 104 includes a seat shell 106 for receiving a child that has a seat portion 108 and a backrest 110. The seat shell 106, including the seat portion 108 and the backrest 110, can be formed by plastic molding. The seat shell 106 can include two support rails 112 protruding at an underside of the seat shell 106 that can rest in contact against an upper surface of the base 102. Once it is arranged on the base 102, a fastener system can be operable to lock the child carrier 104 in position. The assembly of the child carrier 104 and the base 102 can then be installed in a suitable configuration on a vehicle seat, in particular in a position facing rearward (i.e., facing a seatback of a vehicle seat).

The seat portion 108 of the seat shell 106 can have an upper surface 108A on which a child can sit, and can extend from the backrest 110 toward a front of the seat shell 106 and terminate at a front end 106A of the seat shell 106 opposite to the backrest 110. The backrest 110 can be assembled with a headrest 114 that is adjustable to adapt to the height of the child. Moreover, the seat shell 106 can have two lateral guard portions 116 disposed adjacent to a left and a right border of the seat shell 106, which rise upward from the upper surface 108A. The two lateral guard portions 116 can restrict lateral movement of a child received in the seat shell 106.

An extension member 120 can be disposed adjacent to the front end 106A of the seat shell 106, and can be slidably connected with the seat shell 106 for displacement along a lengthwise axis extending from a rear to a front of the seat shell 106. The extension member 120 can have a transversal portion 120A extending across a width of the seat portion 108, two bent portions 120B respectively connected with a left and a right side of the transversal portion 120A, and a forward end 120C. The bent portions 120B can rise upward from the transversal portion 120A, and the forward end 120C can be supported by the transversal portion 120A. In one embodiment, the extension member 120 (including the transversal portion 120A, the two bent portions 120B and the forward end 120C) may be formed as an integral body. The extension member 120 thereby formed may have a generally U-shape with an enlarged transversal portion 120A. The extension member 120 may be arranged through a cavity of the seat shell 106 that generally extends from the front end 106A of the seat shell 106 toward the rear of the seat shell 106, the transversal portion 120A lying below the upper surface 108A, and the two bent portions 120B being respectively adjacent to an underside of the lateral guard portions 116. The extension member 120 is slidable relative to the seat shell 106 to increase or reduce a distance between the forward end 120C of the extension member 120 and the front end 106A of the seat shell 106. For example, the extension member 120 can slide forward relative to the seat shell 106 to a first position where the forward end 120C of the extension member 120 is deployed forward away from the front end 106A of the seat shell 106, and retract into the seat shell 106 to a second position where the forward end 120C lies adjacent to the front end 106A of the seat shell 106. In addition, the extension member 120 can also occupy multiple intermediate positions between the aforementioned first and second positions. When the child safety seat 100 is installed on a vehicle seat in a rear facing position, the forward end 120C of the extension member 120 may be located adjacent to the seatback of the vehicle seat, and the extension member 120 can be adjusted to create more or less space in front of the child safety seat 100 for placement of the child's legs. The extension member 120 thus allows adjustment of a leg room for accommodating children of different ages.

Figure 2:
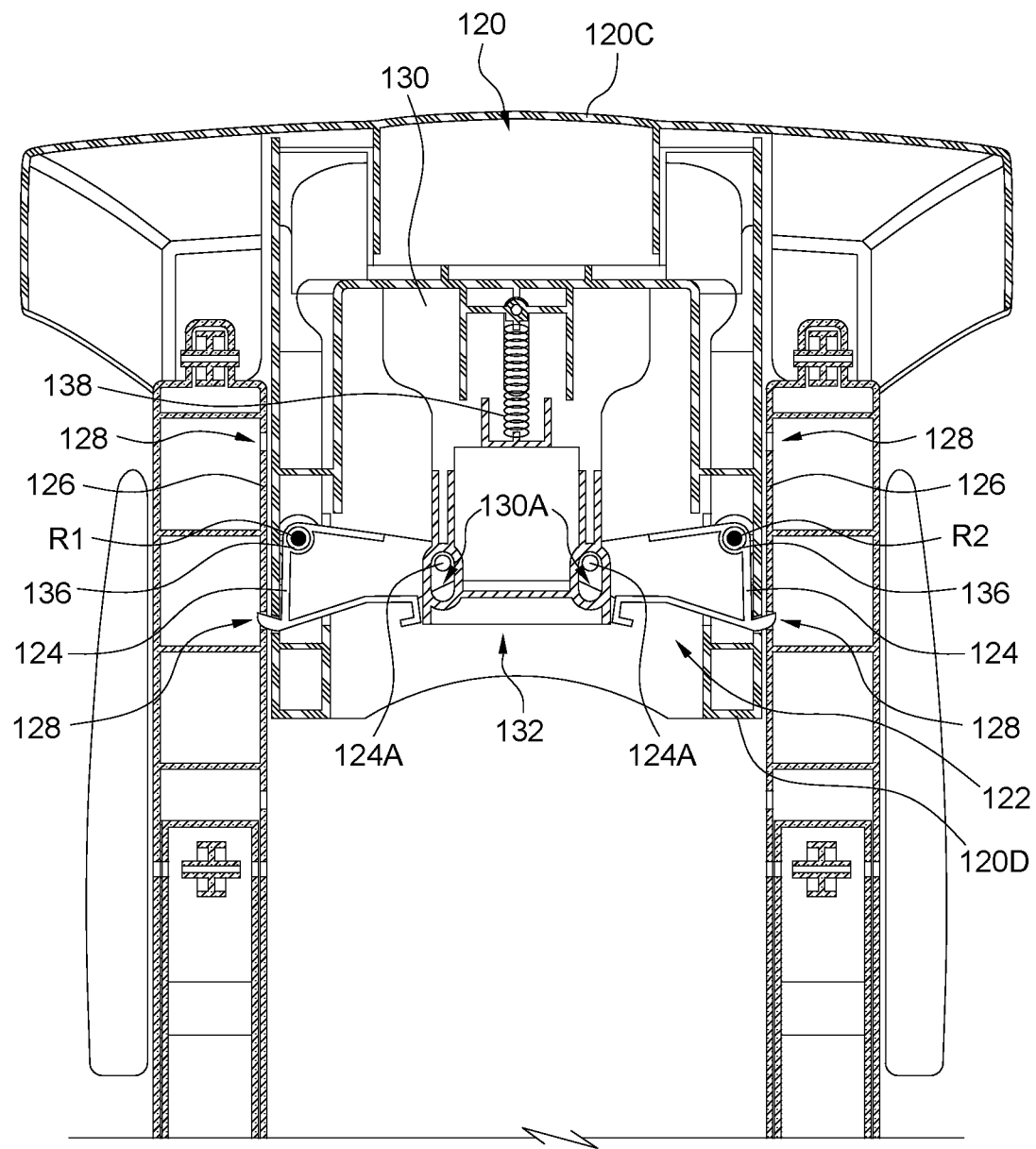
FIG. 2 is a partial cross-sectional view schematically illustrating an extension locking mechanism operable to lock an extension member with respect to a seat shell in the child safety seat.
Figure 3:
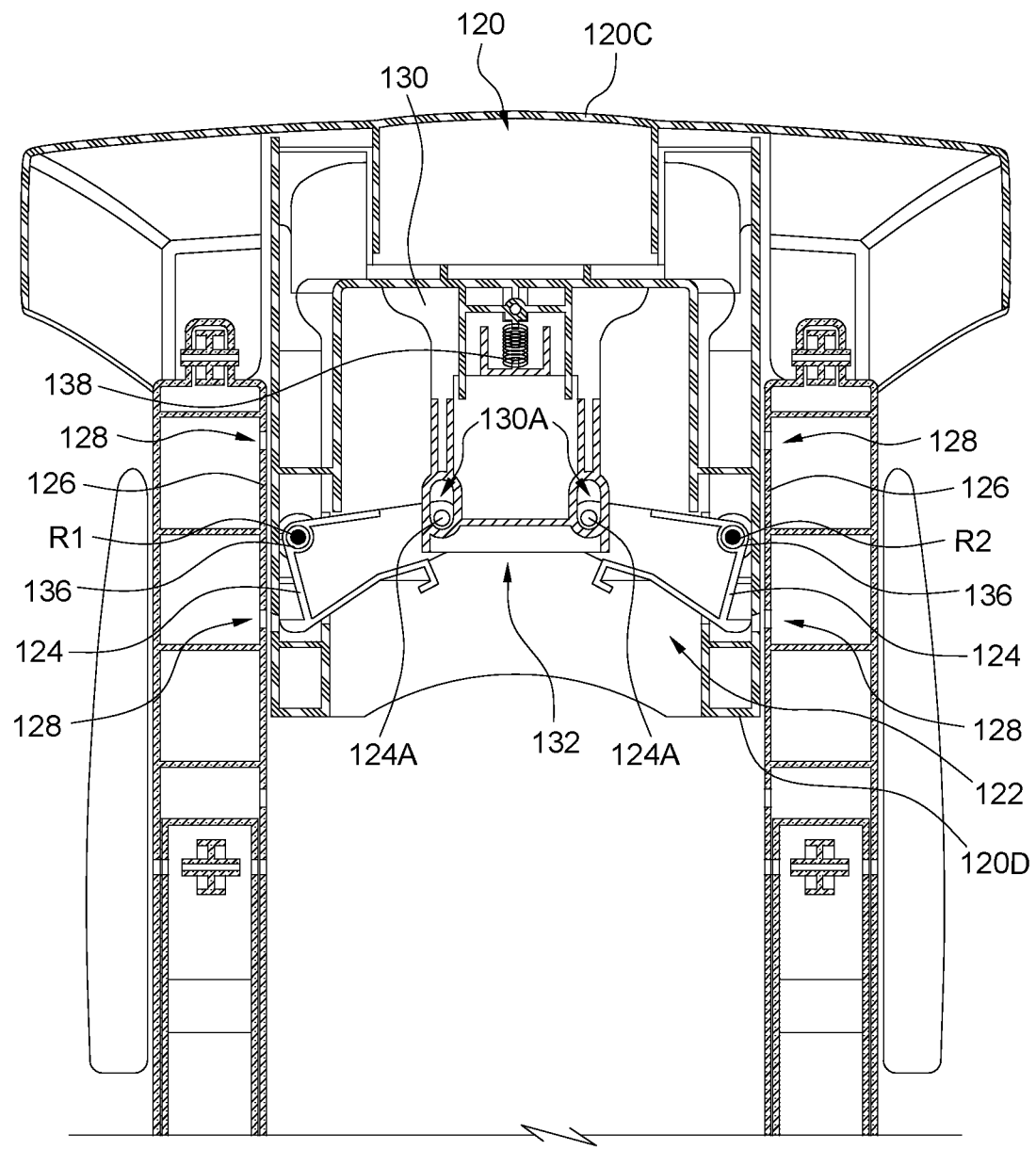
FIG. 3 is a partial cross-sectional view schematically illustrating the extension locking mechanism of FIG. 2 in an unlocking state.

In conjunction with FIG. 1, FIGS. 2 and 3 are schematic partial cross-sectional views illustrating an extension locking mechanism 122 operable to lock the extension member 120 with respect to the seat shell 106. The extension locking mechanism 122 can include two locking parts 124 that are connected with the extension member 120 at two locations transversally spaced apart from each other. The extension member 120 can have a mount portion 120D that is connected with the transversal portion 120A and is arranged between two sidewalls 126 of the seat shell 106. The two locking parts 124 may be pivotally connected with the extension member 120 about pivot axes RI and R2, and may be disposed adjacent to a left and right side edge of the mount portion 120D. Each of the locking parts 124 can be affixed with a pin 124A disposed eccentric from the pivot axis RI or R2. The locking parts 124 can rotate relative to the extension member 120 to respectively engage with the two sidewalls 126 of the seat shell 106 to lock the extension member 120 in position with respect to the seat shell 106. More specifically, each of the sidewalls 126 can have a plurality of apertures 128, and the associated locking part 124 can respectively engage with a first one of the apertures 128 to lock the extension member 120 in the first position, and with a second one of the apertures 128 to lock the extension member 120 in the second position.

The extension locking mechanism 122 can further include a release part 130 that is assembled with the extension member 120 and extends lengthwise into a gap 132 between the two locking parts 124. The release part 130 can be connected with the extension member 120 for sliding displacement along a lengthwise axis extending from a front to a rear of the seat shell 106, and is arranged at a central location of the extension member 120. Two elongated slots 130A may be formed through the release part 130 at two transversally spaced apart locations. When the release part 130 is assembled with the extension member 120, the two pins 124A of the two locking parts 124 can be respectively received in the two slots 130A, the length of the slots 130A being greater than the pins 124A so that limited relative displacement between the release part 130 and the locking parts 124 is allowed. The release part 130 can be located near the forward end 120C, and can be concealed behind a cap 134 formed with the forward end 120C. The release part 130 can be movable between a locking position shown in FIG. 2 and an unlocking position shown in FIG. 3. In the locking position shown in FIG. 2, the locking parts 124 can engage with the sidewalls 126 of the seat shell 106 for locking the extension member 120 in position. Torsion springs 136 can be used to bias the locking parts 124 to engage with the sidewalls 126.

For unlocking the locking parts 124, the release part 130 is pulled forward so that it moves relative to the extension member 120 away from the gap 132 for allowing unlocking rotation of the locking parts 124. As the release part 130 continues to move further forward, end edges of the slots 130A can respectively contact and engage with the pins 124A, whereby the locking parts 124 are urged in rotation by the release part 130 to disengage from the sidewalls 126 of the seat shell 106 for unlocking the extension member 120. In one embodiment, the release part 130 may be biased by a spring 138 toward the locking position, and a caregiver can pull the release part 130 forward against the biasing force of the spring 138 to switch the release part 130 from the locking position to the unlocking position for displacement of the extension member 120.

Figure 4:
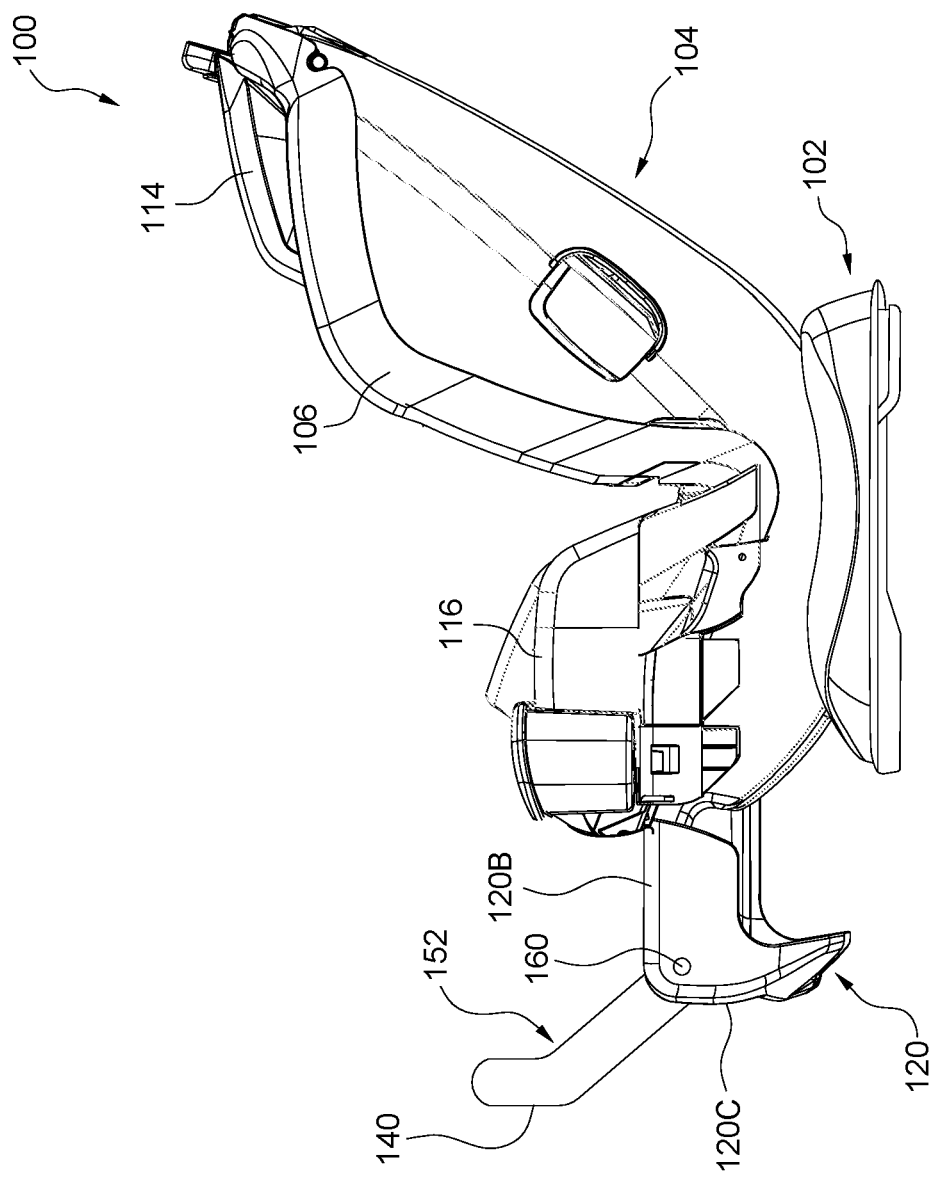
FIG. 4 is a side view illustrating the child safety seat of FIG. 1 with an anti-rebound part installed thereon.
Figure 5:
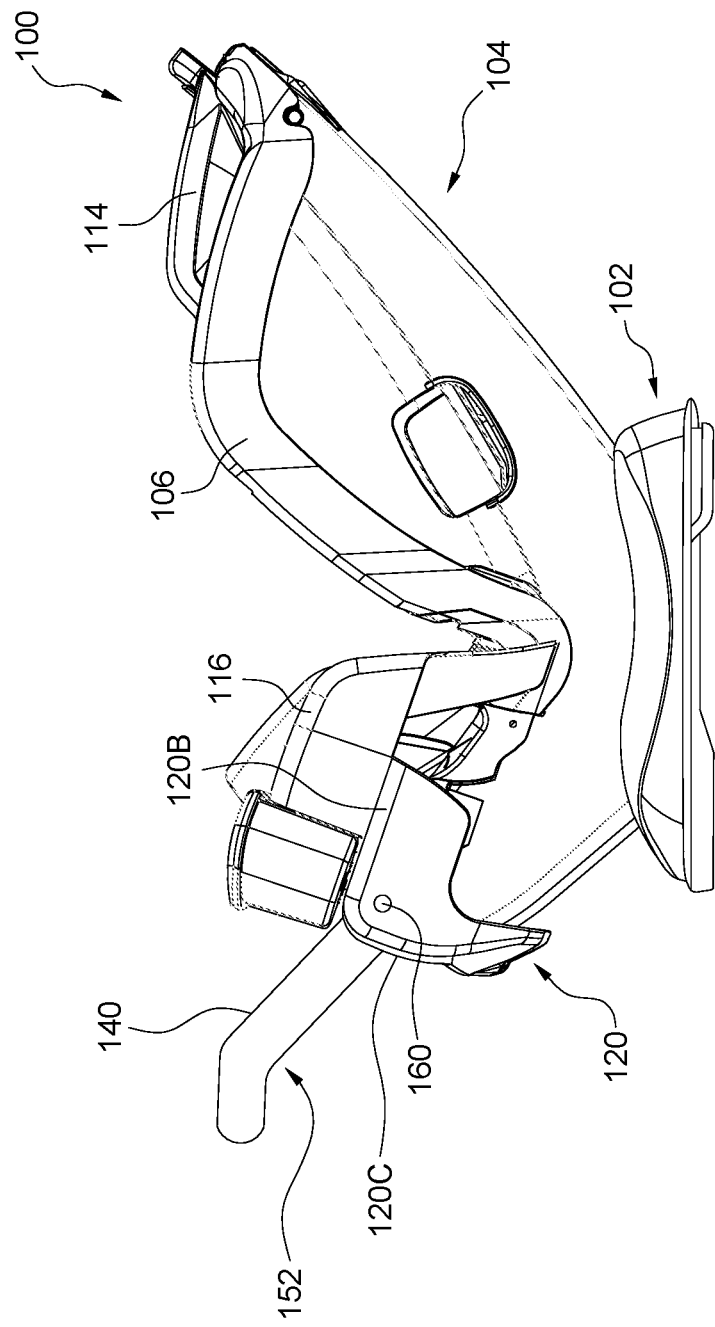
FIG. 5 is a side view illustrating the child safety seat of FIG. 1 with the anti-rebound part installed in another configuration.
Figure 6:
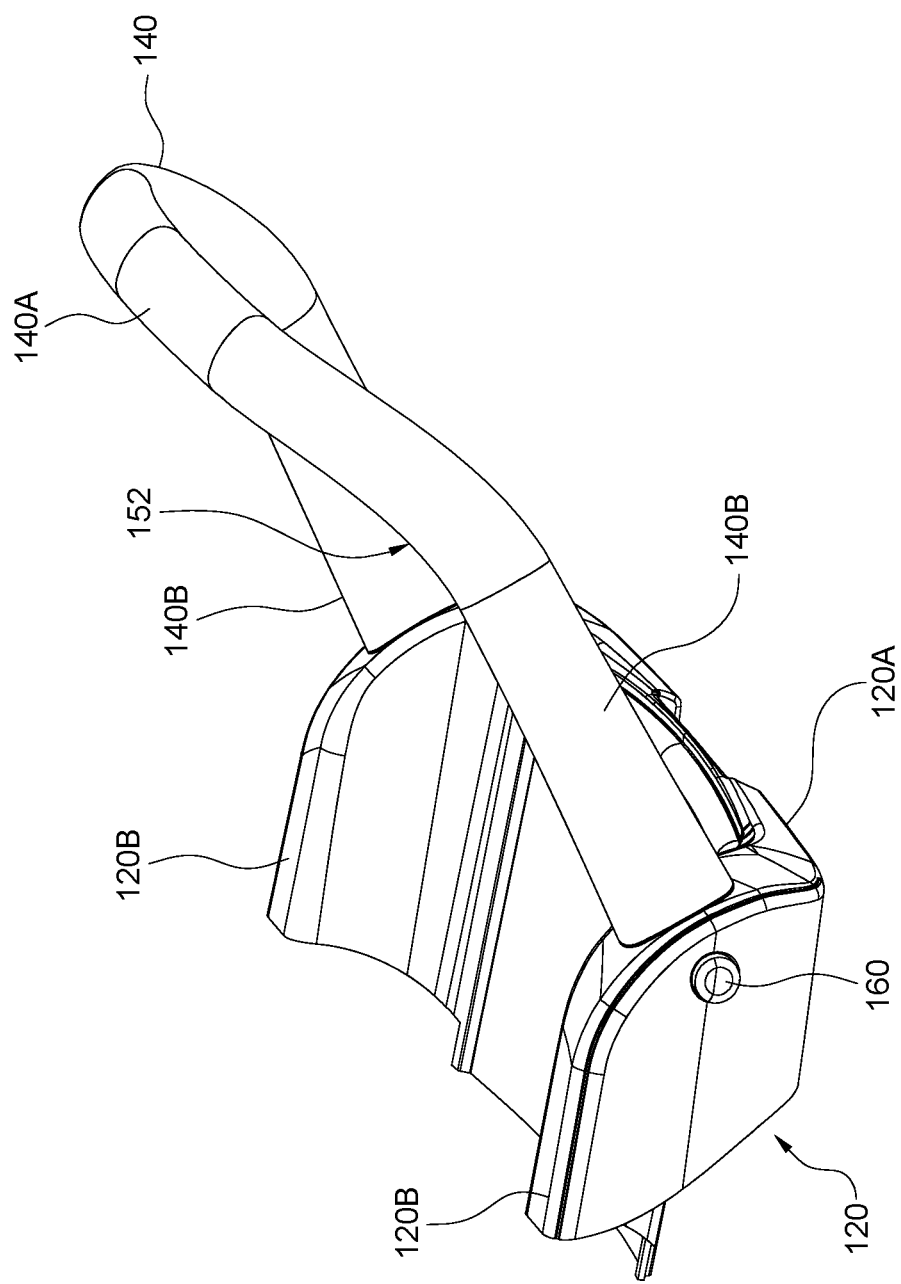
FIG. 6 is a perspective view illustrating the anti-rebound part mounted on the extension member.
Figure 7:
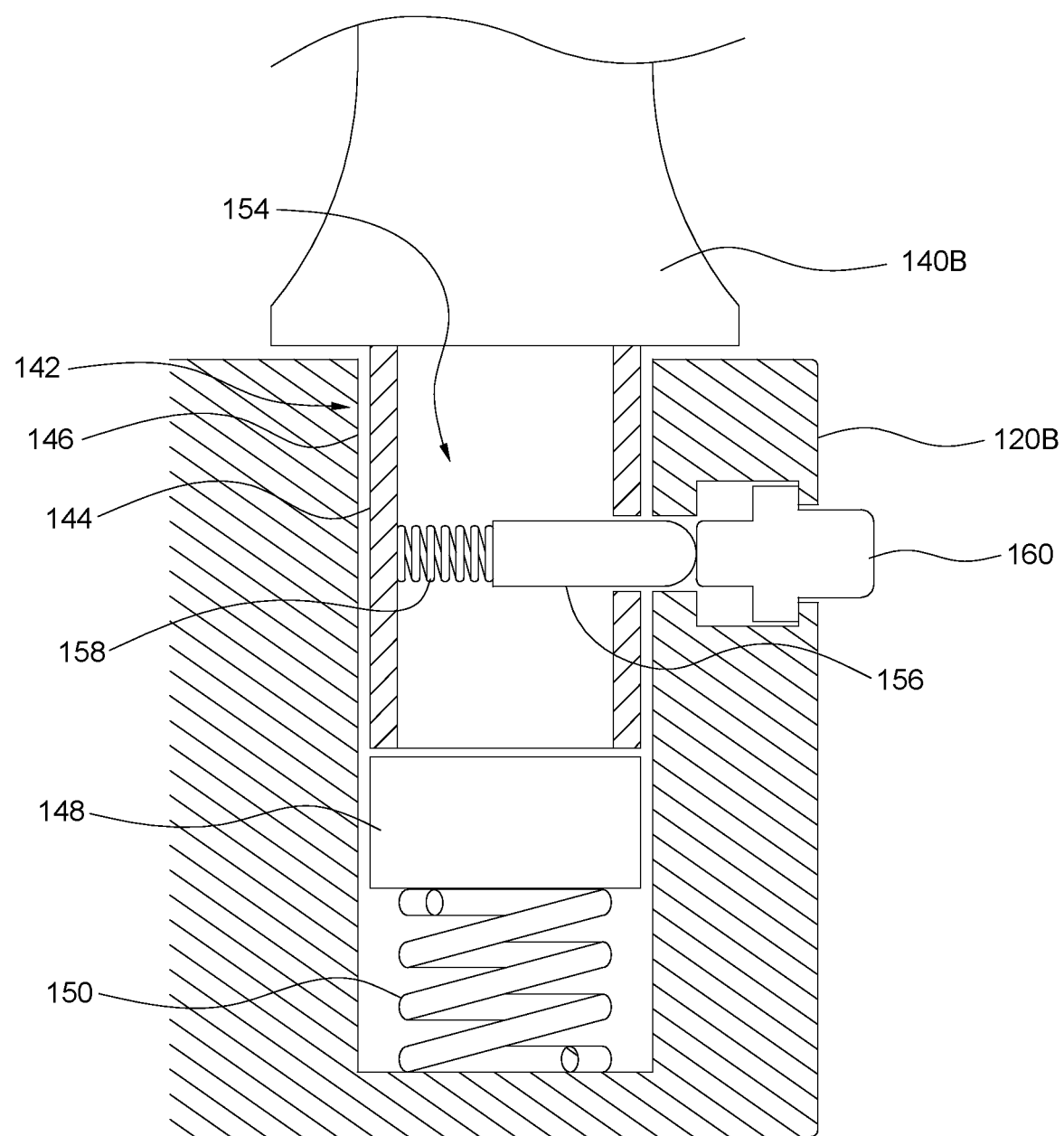
FIG. 7 is a cross-sectional view illustrating further construction details of the anti-rebound part shown in FIG. 6 mounted on the extension member.

In conjunction with FIG. 1, FIGS. 4 and 5 are two side views illustrating the child safety seat 100 with an anti-rebound part 140 installed thereon, FIG. 6 is a perspective view illustrating the anti-rebound part 140 mounted on the extension member 120, and FIG. 7 is a cross-sectional view illustrating further construction details of the anti-rebound part 140 mounted on the extension member 120. Referring to FIGS. 1 and 4-7, the child safety seat 100 can further include an anti-rebound part 140 adapted to prevent rebound of the child safety seat 100 during a vehicle collision. More specifically, the child safety seat 100 is installable on a vehicle seat in a rear facing position with the anti-rebound part 140 restrictedly positioned on the extension member 120 and adjacent to a seatback of the vehicle seat, the anti-rebound part 140 extending at an angle above the extension member 120. When a vehicle collision occurs, the anti-rebound part 140 can press against the seatback of the vehicle seat to dissipate rebound impact and prevent the child safety seat 100 from rotating into the vehicle seat.

According to an example of construction, the anti-rebound part 140 includes a transversal portion 140A, and two side portions 140B respectively connected with the transversal portion 140A at a left and a right side thereof. An exemplary shape of the anti-rebound part 140 may include a rigid bar having a generally U-shape. The anti-rebound part 140 including the transversal portion 140A and the two side portions 140B may be formed integrally as a single part.

According to an embodiment, the anti-rebound part 140 is installable on and removable from the extension member 120. For example, the extension member 120 can have two sockets 142, and the two side portions 140B of the anti-rebound part 140 are respectively connectible with the two sockets 142. According to an example of construction, the two side portions 140B of the anti-rebound part 140 can respectively have two tube portions 144 (better shown in FIG. 7) that can be respectively inserted into and removed from the two sockets 142. The anti-rebound part 140 can be thereby carried by the extension member 120, and can move along with the extension member 120 during sliding adjustment of the extension member 120 relative to the seat shell 106.

According to an example of construction, the two sockets 142 can be respectively provided on the two bent portions 120B of the extension member 120, whereby the two side portions 140B of the anti-rebound part 140 are restrictedly positionable on the two bent portions 120B of the extension member 120. The two sockets 142 can have a same construction. As better shown in FIG. 7, each socket 142 can exemplarily include an opening 146, a shutter 148, and a spring 150 having two ends respectively connected with the shutter 148 and an inner surface of the extension member 120 inside the opening 146. The shutter 148 can be biased by the action of the spring 150 to close the opening 146 of the socket 142 when the anti-rebound part 140 is removed from the extension member 120, and each tube portion 144 of the anti-rebound part 140 is insertable into the opening 146 of one socket 142 by pushing against the shutter 148 thereof. The shutters 148 described herein may help to prevent contaminants from entering the openings 146 of the sockets 142. It will be appreciated, however, that some variant embodiments may omit the shutters 148 and the springs 150.

Referring to FIGS. 4-6, the anti-rebound part 140 may have a bend that forms a concavity 152. The concavity 152 may be exemplarily located adjacent to a joining region between the transversal portion 140A and the two side portions 140B of the anti-rebound part 140. The anti-rebound part 140 is installable on the extension member 120 in a first configuration with the concavity 152 facing rearward relative to the seat shell 106 (i.e., facing the backrest 110) and in a second configuration with the concavity 152 facing forward relative to the seat shell 106 (i.e., facing the front of the seat shell 106). In FIG. 4, the anti-rebound part 140 is shown in the first configuration. When the child safety seat 100 is installed in the rear facing position with the seat shell 106 in an upright position, the anti-rebound part 140 can be positioned in the first configuration so that the anti-rebound part 140 can follow the slope of the vehicle seatback. In FIG. 5, the anti-rebound part 140 is shown in the second configuration. When the seat shell 106 is reclined, the anti-rebound part 140 can be positioned in the second configuration to facilitate contact with the vehicle seatback.

Referring to FIGS. 1 and 4-7, the child safety seat 100 can further include an anti-rebound locking mechanism 154 operable to lock the anti-rebound part 140 on the extension member 120. The anti-rebound locking mechanism 154 can include a latch 156, a spring 158 and a release actuator 160. The same anti-rebound locking mechanism 154 can be symmetrically provided on the left and right side of the anti-rebound part 140, and FIG. 7 illustrates the anti-rebound locking mechanism 154 provided at one of the left and right sides. The latch 156 can be assembled with one tube portion 144 of the anti-rebound part 140. For example, the latch 156 can be a locking pin slidably connected with the tube portion 144 of the anti-rebound part 140. The latch 156 is movable to respectively protrude sideways outside the tube portion 144 for engaging with the extension member 120 and retract inwards for disengaging from the extension member 120. The latch 156 can engage with the extension member 120 to lock the anti-rebound part 140 on the extension member 120, and disengage from the the extension member 120 for unlocking and removing the anti-rebound part 140.

The spring 158 can bias the latch 156 to protrude outside the tube portion 144 for engaging with the extension member 120. According to an example of construction, the spring 158 can be disposed inside the tube portion 144, and can be respectively connected with the latch 156 and an inner sidewall of the tube portion 144.

The release actuator 160 can be assembled with the extension member 120, and can be disposed adjacent to the socket 142 where the tube portion 144 is inserted. For example, the release actuator 160 can be a release button slidably connected with the extension member 120. The release actuator 160 is operable to contact and urge the latch 156 to disengage from the extension member 120 for removal of the anti-rebound part 140.

When the tube portions 144 of the anti-rebound part 140 are inserted into the sockets 142, each latch 156 can engage with the extension member 120 for locking the anti-rebound part 140 on the extension member 120. For removing the anti-rebound part 140 from the extension member 120, the release actuator 160 can be depressed to cause the latch 156 to disengage from the extension member 120 and thereby unlock the anti-rebound part 140 with respect to the extension member 120.

The anti-rebound locking mechanism 154 described herein can securely lock the anti-rebound part 140 with respect to the extension member 120, and can be operated by a caregiver to unlock the anti-rebound part 140. It will be appreciated, however, that some variant embodiments may omit the anti-rebound locking mechanism 154. For example, the anti-rebound part 140 may be held in position on the extension member 120 by simply inserting the tube portions 144 of the anti-rebound part 140 into the sockets 142 without providing the anti-rebound locking mechanism 154. In other embodiments, detents may be provided to hold the anti-rebound part 140 in place.

FIGS. 8-11 are various schematic views illustrating another embodiment of an anti-rebound part 240 provided in the child safety seat 100. Referring to FIGS. 8-11, the anti-rebound part 240 is carried by the extension member 120, and can move along with the extension member 120 relative to the seat shell 106 during adjustment of the extension member 120. The extension member 120 may be locked with respect to the seat shell 106 with an extension locking mechanism, which may be similar to the extension locking mechanism 122 described previously. According to an example of construction, the anti-rebound part 240 includes a transversal portion 240A, and two side portions 240B respectively connected with the transversal portion 240A at a left and a right side thereof. The anti-rebound part 240 thereby formed may have, e.g., a generally U-shape.

The anti-rebound part 240 can be connected with the extension member 120 via two linkages 242 having a same construction. For example, the two linkages 242 can respectively couple the two side portions 240B of the anti-rebound part 240 to the two bent portions 120B of the extension member 120 in a symmetrical manner. According to an example of construction, the linkage 242 provided at each of the left and right sides can include two bars 244 and 246, each of the two bars 244 and 246 being respectively connected pivotally with the bent portion 120B of the extension member 120 and the side portion 240B of the anti-rebound part 240.

Figure 8:
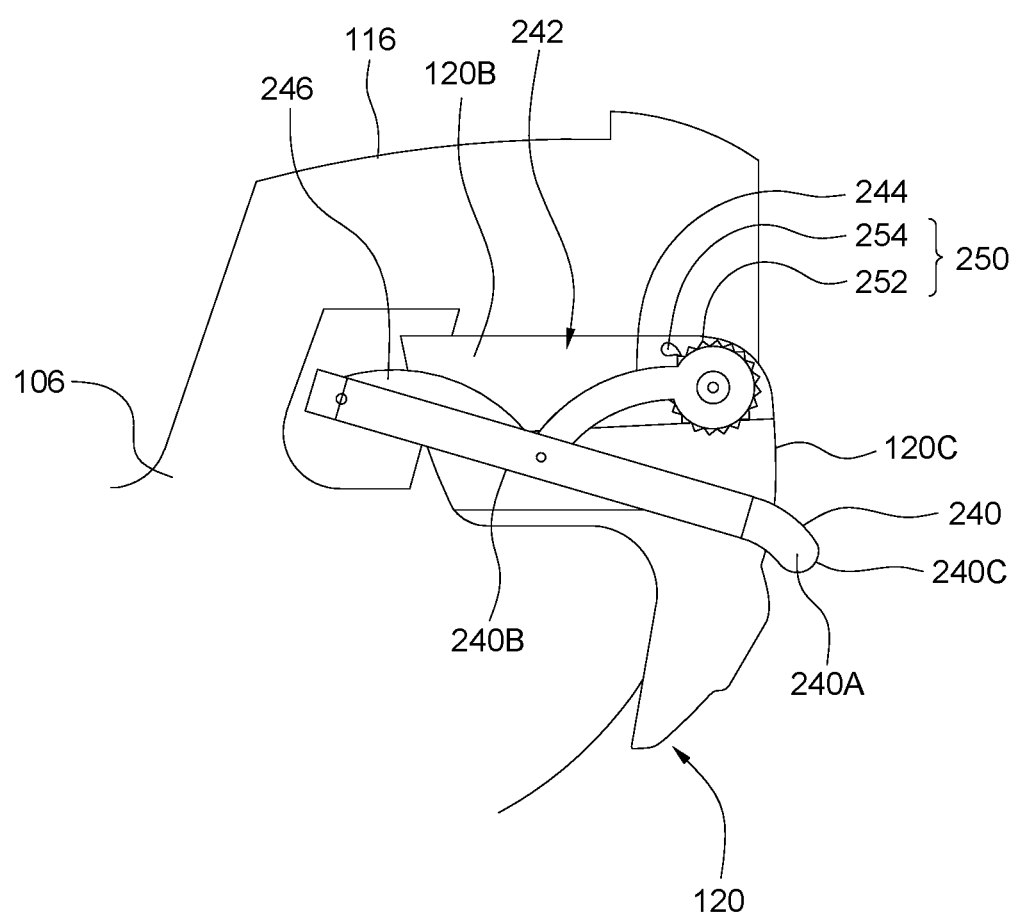
FIG. 8 is a schematic side view illustrating another embodiment of an anti-rebound part provided in a child safety seat.
Figure 9:
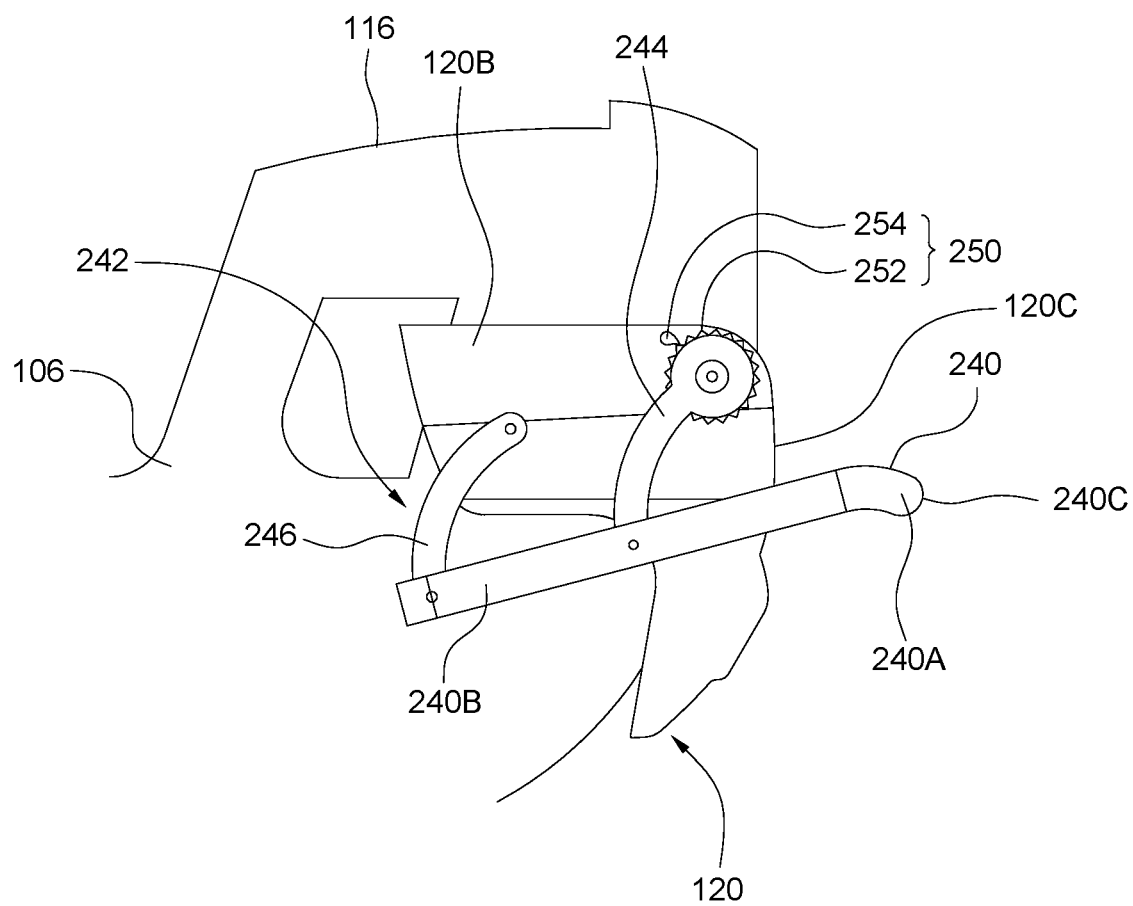
FIG. 9 is a schematic side view illustrating the embodiment of FIG. 8 with the anti-rebound part in an intermediate position.
Figure 10:
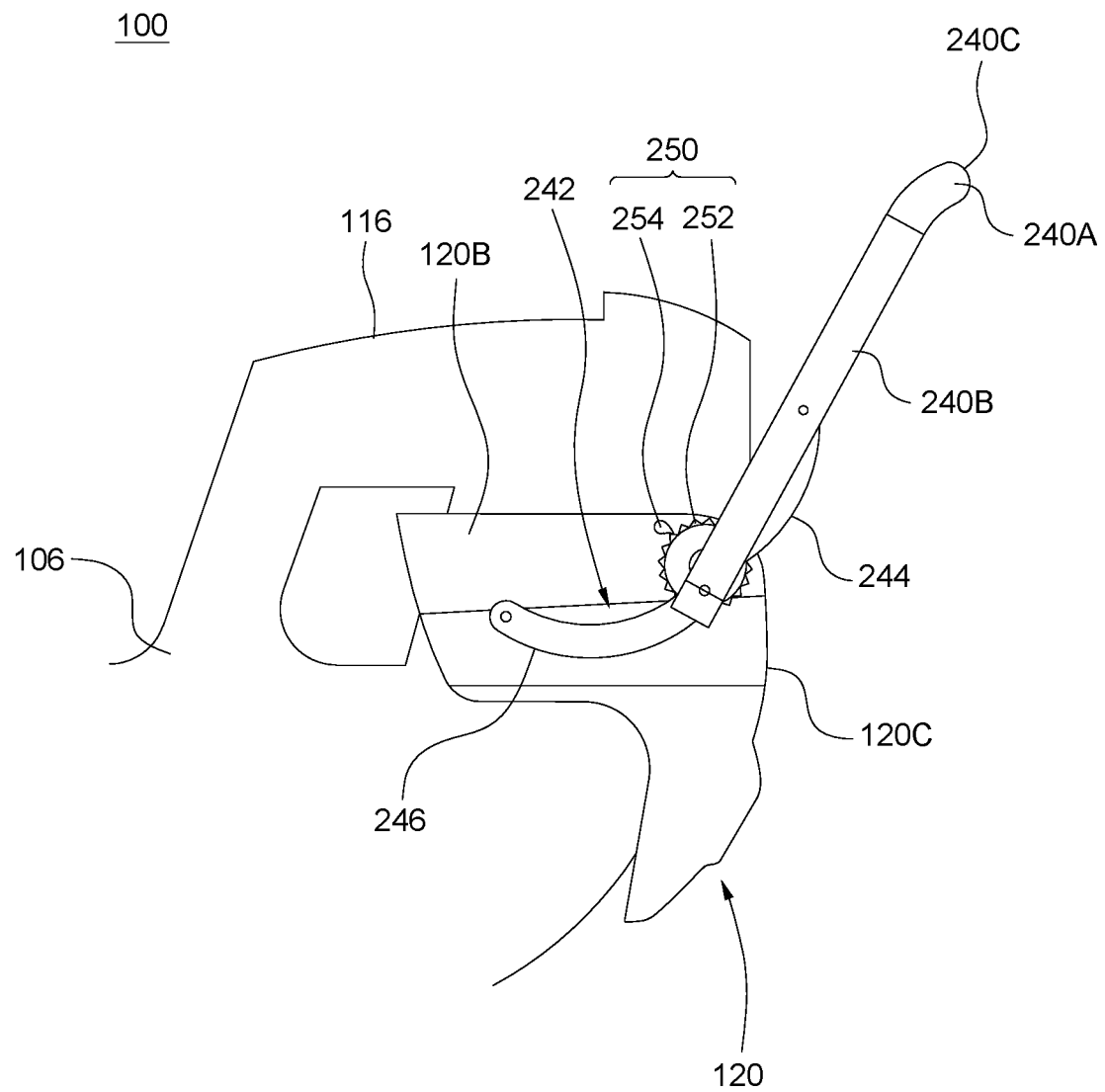
FIG. 10 is a schematic side view illustrating the embodiment of FIG. 8 with the anti-rebound part in a deployed position for use.
Figure 11:
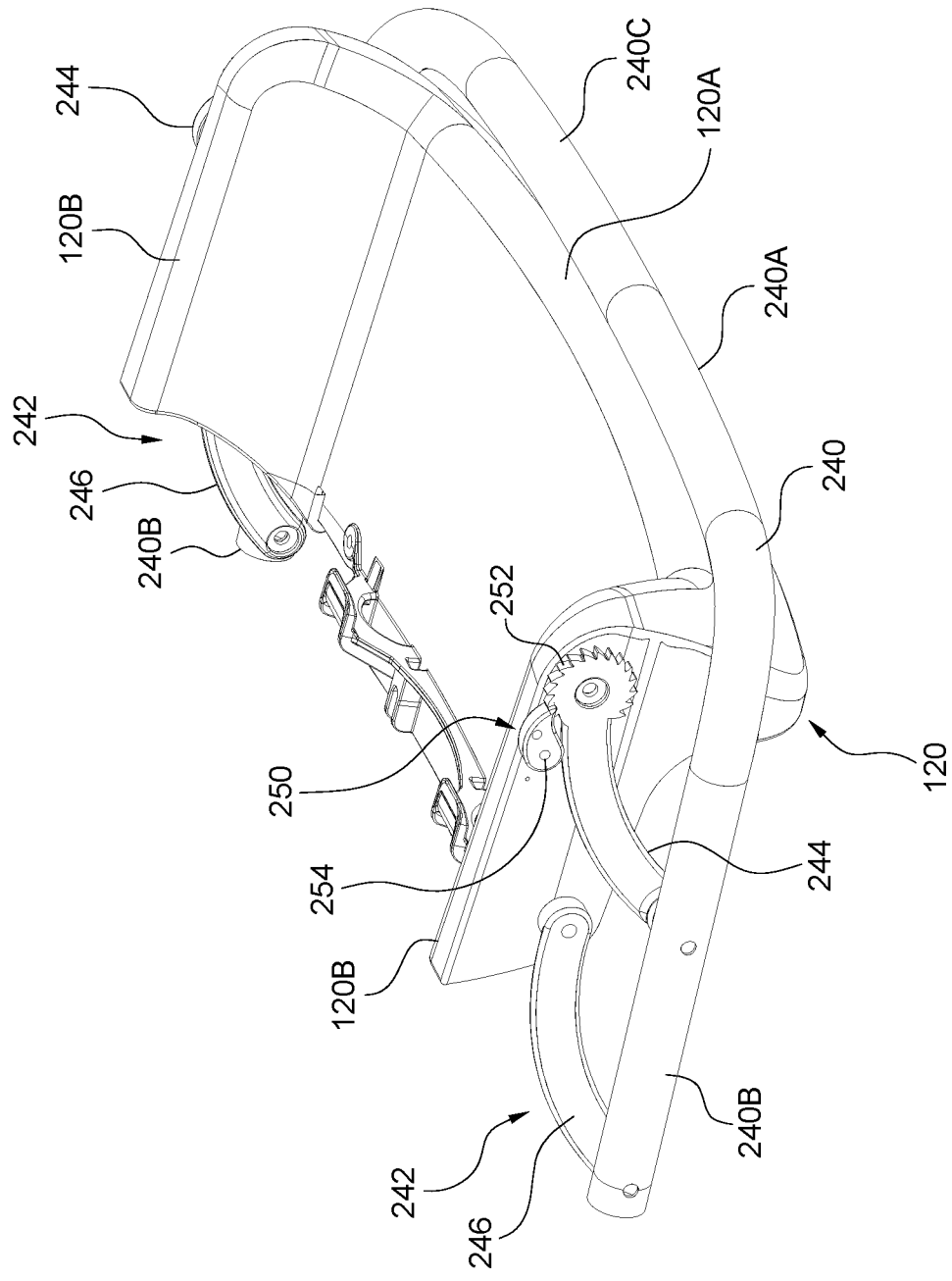
FIG. 11 is perspective view illustrating the assembly of the anti-rebound part with the extension member in the embodiment of FIG. 8.

With the aforementioned construction, the anti-rebound part 240 is movable relative to the extension member 120 in a forward direction for deployment and in a rearward direction for stowage. In particular, the anti-rebound part 240 may be stowed in a first angular position relative to the extension member 120 and deployable to at least one second angular position relative to the extension member 120 that is tilted at an angle from the first angular position, the anti-rebound part 240 extending forward and upward in the second angular position. FIG. 8 shows the anti-rebound part 240 in the first angular position corresponding to a stowed position, FIG. 10 shows the anti-rebound part 240 in the second angular position corresponding to a deployed position for use, and FIG. 9 shows the anti-rebound part 240 in an intermediate position between the first angular position and the second angular position. According to an example of construction, the anti-rebound part 240 can have a distal end 240C supported by the transversal portion 240A of the anti-rebound part 240, the distal end 240C being positioned adjacent to the forward end 120C of the extension member 120 in the first angular position and displaced forward and away from the forward end 120C of the extension member 120 in the second angular position. When the child safety seat 100 is installed on a vehicle seat in a rear facing position, the anti-rebound part 240 can be deployed to the second angular position so as to extend above the extension member 120 and lie adjacent to a seatback of the vehicle seat. When the anti-rebound part 240 is not used, the anti-rebound part 240 can be stowed in the first angular position with the two side portions 240B thereof respectively extending alongside the two bent portions 120B of the extension member 120.

Referring to FIGS. 8-11, the child safety seat 100 can further include an anti-rebound locking mechanism 250 operable to lock the anti-rebound part 240 with respect to the extension member 120. According to an example of construction, the anti-rebound locking mechanism 250 can include a locking structure 252 provided in one linkage 242, and a latch 254 that is connected with the extension member 120 and is movable to engage an disengage the locking structure 252. More specifically, the locking structure 252 can be provided on one of the two bars 244 and 246 of the linkage 242 at one of the left and right sides, and the latch 254 can be connected with the bent portion 120B of the extension member 120 at the same side. According to an example of construction, the latch 254 may be pivotally connected with the extension member 120, and the locking structure 252 can include a plurality of teeth provided on a rounded end of the bar 244 that is pivotally connected with the extension member 120. The latch 254 is movable relative to the extension member 120 to engage with the locking structure 252 for locking the anti-rebound part 240 with respect to the extension member 120, and to disengage from the locking structure 252 for unlocking the anti-rebound part 240 with respect to the extension member 120. The same anti-rebound locking mechanism 250 described above may be provided at each of the left and right sides of the extension member 120.

With the aforementioned construction, the anti-rebound locking mechanism 250 can lock the anti-rebound part 240 in a stowed position and multiple deployed positions relative to the extension member 120. A caregiver thus can flexibly adjust the anti-rebound part 240 so that it suitably contacts a vehicle seatback for different recline positions of the seat shell 106.

Figure 12:
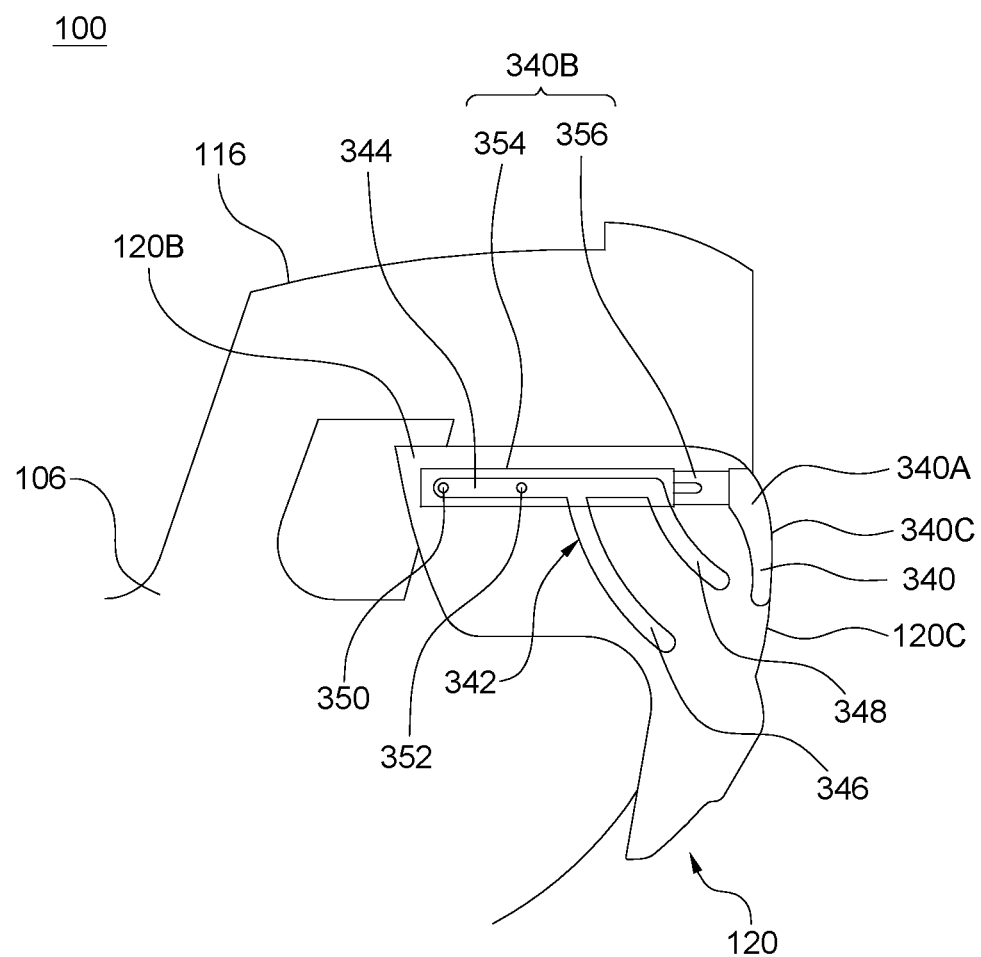
FIG. 12 is a schematic side view illustrating another embodiment of an anti-rebound part provided in a child safety seat.
Figure 13:
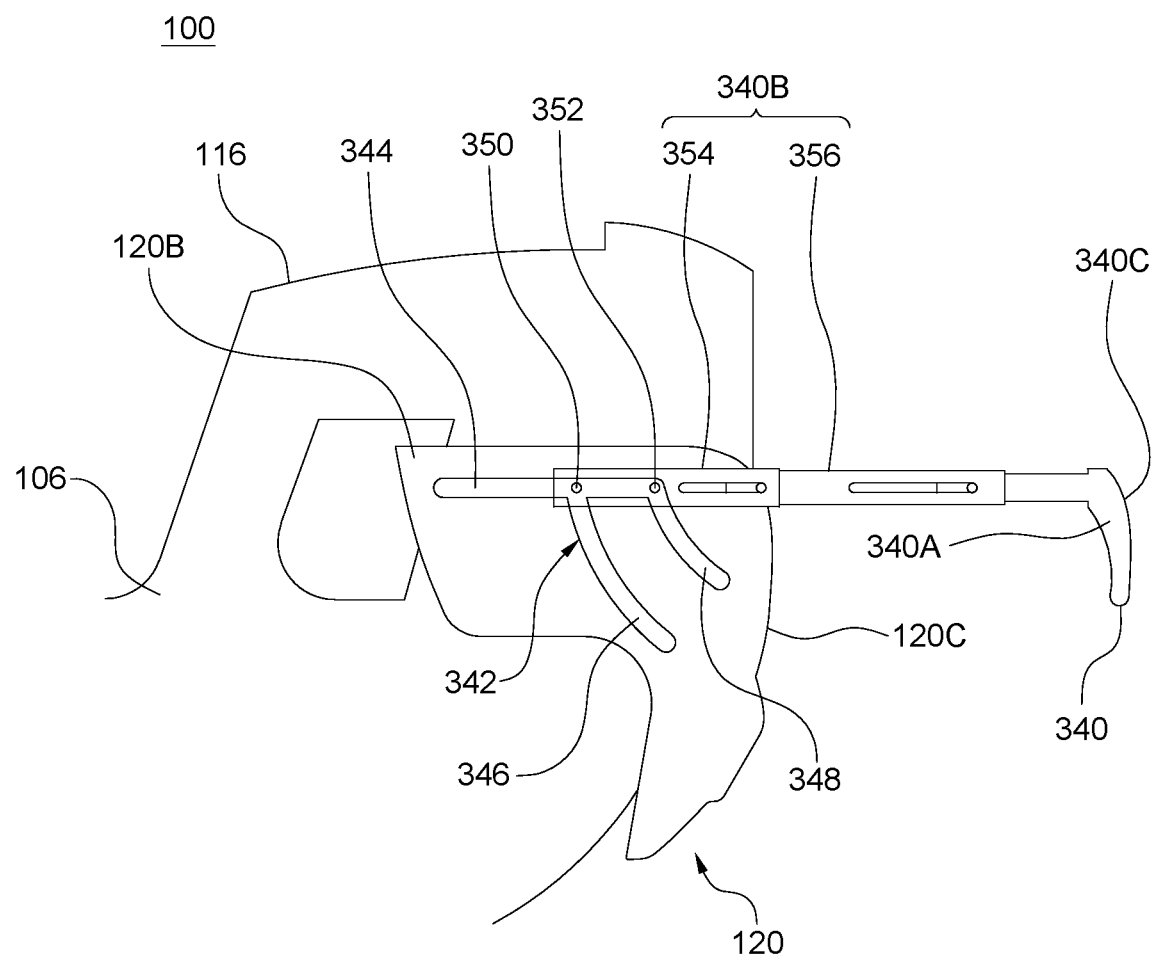
FIG. 13 is a schematic side view illustrating the embodiment of FIG. 12 with the anti-rebound part in an intermediate position.
Figure 14:
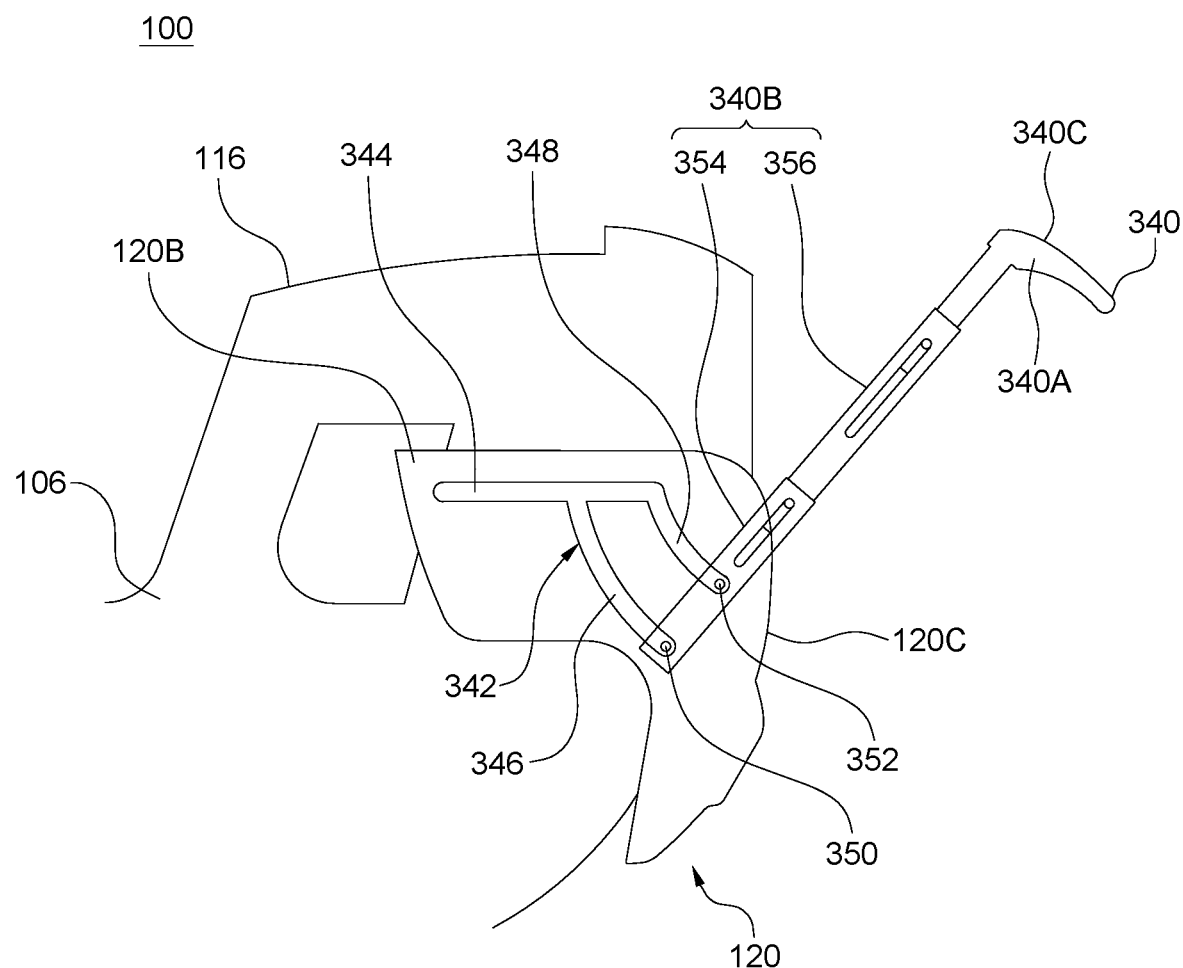
FIG. 14 is a schematic side view illustrating the embodiment of FIG. 12 with the anti-rebound part in a deployed position for use.

FIGS. 12-14 are various schematic side views illustrating another embodiment of an anti-rebound part 340 provided in the child safety seat 100. Referring to FIGS. 12-14, the anti-rebound part 340 is carried by the extension member 120, and can move along with the extension member 120 relative to the seat shell 106 during adjustment of the extension member 120. The extension member 120 may be locked with respect to the seat shell 106 with an extension locking mechanism, which may be similar to the extension locking mechanism 122 described previously. The anti-rebound part 340 can include a transversal portion 340A, and two side portions 340B respectively connected with the transversal portion 340A at a left and a right side thereof. The anti-rebound part 340 thereby formed may include, e.g., a generally U-shape. FIGS. 12-14 are side views showing only one side portion 340B, the other one can be symmetrically identical to the side portion 340B shown in FIG. 12-14.

The anti-rebound part 340 can be connected with two guide tracks 342 respectively provided on a left and a right side of the extension member 120, e.g., on the bent portions 120B of the extension member 120. The two guide tracks 342 have the same construction and are symmetrically affixed to the left and right sides of the extension member 120, FIGS. 12-14 showing only the guide track 342 provided on one of the left and right sides. According to an example of construction, each guide track 342 can include a track portion 344 having a straight shape, and two track portions 346 and 348 having an arcuate shape that are connected with the track portion 344, the arcuate track portions 346 and 348 being concentric. At each of the left and right sides, the side portion 340B of the anti-rebound part 340 can be fixedly connected with two pins 350 and 352 that are guided for sliding along the guide track 342.

With the aforementioned construction, the anti-rebound part 340 is movable relative to the extension member 120 in a forward direction for deployment and in a rearward direction for stowage. In particular, the anti-rebound part 340 may be stowed in a first angular position relative to the extension member 120 and deployable to at least one second angular position relative to the extension member 120 that is tilted at an angle from the first angular position, the anti-rebound part 340 extending forward and upward in the second angular position. FIG. 12 shows the anti-rebound part 340 in the first angular position corresponding to a stowed position, FIG. 14 shows the anti-rebound part 340 in the second angular position corresponding to a deployed position for use, and FIG. 13 shows the anti-rebound part 340 in an intermediate position between the first and second angular position. At each of the left and right sides, a sliding movement of the pins 350 and 352 along the track portion 344 can correspond to a sliding displacement of the anti-rebound part 340 between the first angular position of FIG. 12 and the intermediate position of FIG. 13, and respective sliding movements of the pins 350 and 352 along the track portions 346 and 348 can correspond to a rotation of the anti-rebound part 340 between the intermediate position of FIG. 13 and the second angular position of FIG. 14. The sliding connection of the pins 350 and 352 with the guide track 342 thus allows the anti-rebound part 340 to slide back and forth and rotate for adjustment.

According to an example of construction, the anti-rebound part 340 can have a distal end 340C supported by the transversal portion 340A of the anti-rebound part 340, the distal end 340C being positioned adjacent to the forward end 120C of the extension member 120 in the first angular position and displaced forward and away from the forward end 120C of the extension member 120 in the second angular position. When the child safety seat 100 is installed on a vehicle seat in a rear facing position, the anti-rebound part 340 can be deployed to the second angular position so as to extend above the extension member 120 and lie adjacent to a seatback of the vehicle seat. When the anti-rebound part 340 is not used, the anti-rebound part 340 can be stowed in the first angular position with the two side portions 340B thereof respectively extending alongside the two bent portions 120B of the extension member 120.

Referring to FIGS. 12-14, the anti-rebound part 340 may have a telescopic structure. For example, each side portion 340B of the anti-rebound part 340 may include two side segments 354 and 356 telescopically assembled with each other, the transversal portion 340A may be telescopically assembled with the side segment 356 of each side portion 340B, and the two pins 350 and 352 on each side portion 340B may be fixedly connected with the side segment 354. The telescopic structure of the anti-rebound part 340 may include any suitable locking devices for locking its extending length. For example, one or more of the transversal portion 340A and the side segments 354 and 356 may include one or more latch adapted to lock the telescopic structure in a desirable extending length. With a telescopic construction, the side segments 354 and 356 and the transversal portion 340A may be collapsed into one another to shorten the anti-rebound part 340 for compact stowage in the first angular position, as shown in FIG. 12. When the anti-rebound part 340 is deployed for use to the second angular position of FIG. 14, the side segments 354 and 356 and the transversal portion 340A may be extended from one another to increase the length of the anti-rebound part 340.

The anti-rebound part 340 may be locked in position with various anti-rebound locking mechanisms. For example, a suitable anti-rebound locking mechanism may include one or more latch provided on the anti-rebound part 340 that can engage with different regions of the extension member 120 to lock the anti-rebound part 340 in the stowed position of FIG. 12, the deployed position of FIG. 14, and/or any other desirable positions. According to another example of construction, detents may be provided to hold the anti-rebound part 340 in any desirable positions. For example, the detents may be protrusions provided at locations along each guide track 342 corresponding to desirable positions of the anti-rebound part 340, and can engage with the pins 350 and 352 to hold the anti-rebound part 340 in the desirable positions.

Figure 15:
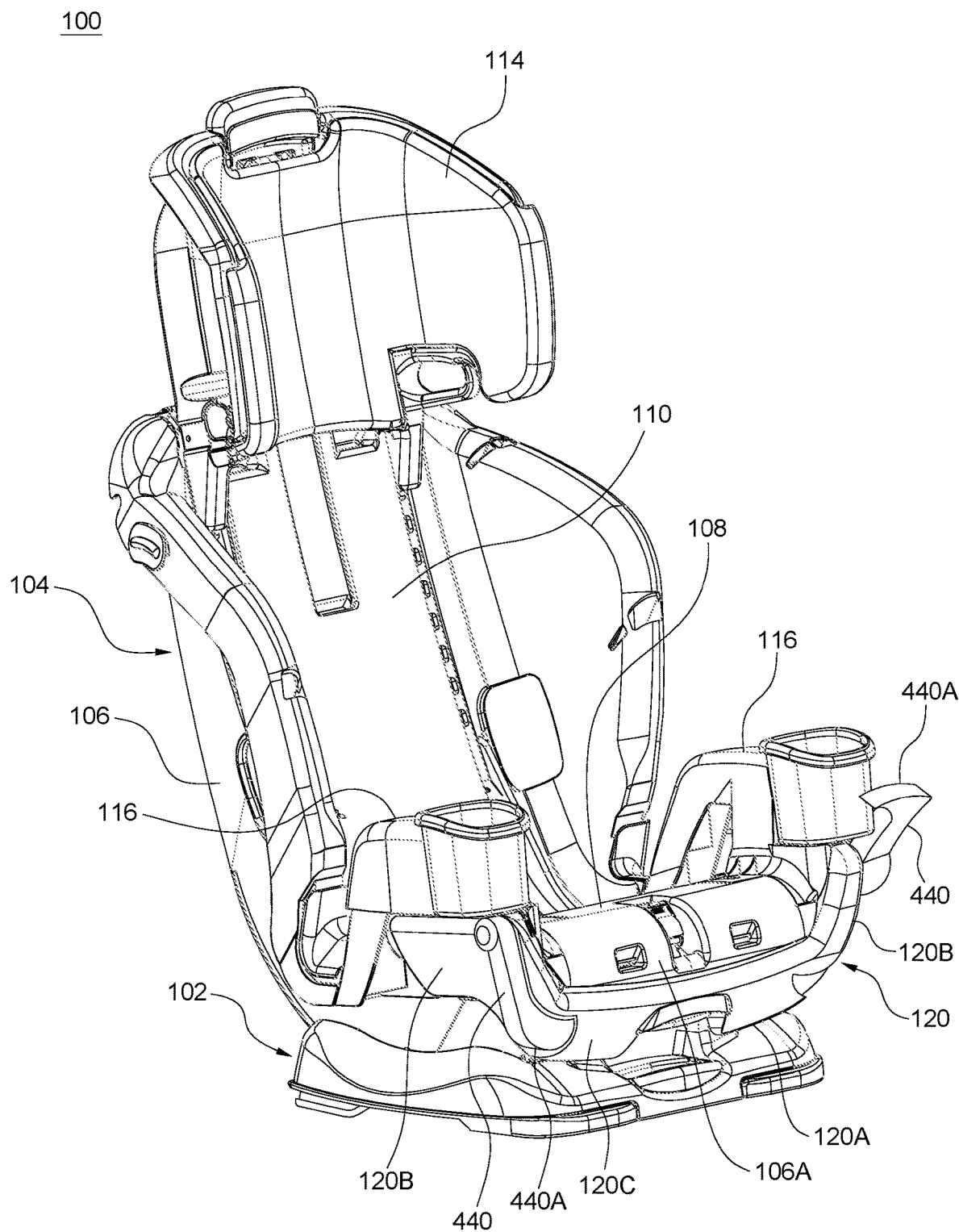
FIG. 15 is a perspective view illustrating another embodiment in which two anti-rebound parts are pivotally connected with an extension member in a child safety seat.

FIG. 15 is a perspective view illustrating another embodiment in which two anti-rebound parts 440 are provided in the child safety seat 100. The two anti-rebound parts 440 can be two paddles that are respectively connected pivotally with the two bent portions 120B of the extension member 120, whereby the two paddles are rotatable independently from each other relative to the extension member 120. More specifically, each anti-rebound part 440 is rotatable between a first angular position corresponding to a stowed position where a distal end 440A of the anti-rebound part 440 is positioned adjacent to the forward end 120C of the extension member 120, and a second angular position tilted at an angle relative to the first angular position that corresponds to a deployed position where the distal end 440A of the anti-rebound part 440 is displaced away from the forward end 120C of the extension member 120. In the second angular position, the anti-rebound part 440 may extend forward and upward from the extension member 120. The extension member 120 may be locked with respect to the seat shell 106 with an extension locking mechanism, which may be similar to the extension locking mechanism 122 described previously. When the child safety seat 100 is installed on a vehicle seat in a rear facing position, each anti-rebound part 440 can be deployed to the second angular position so as to extend above the extension member 120 and lie adjacent to a seatback of the vehicle seat.

Figure 16:
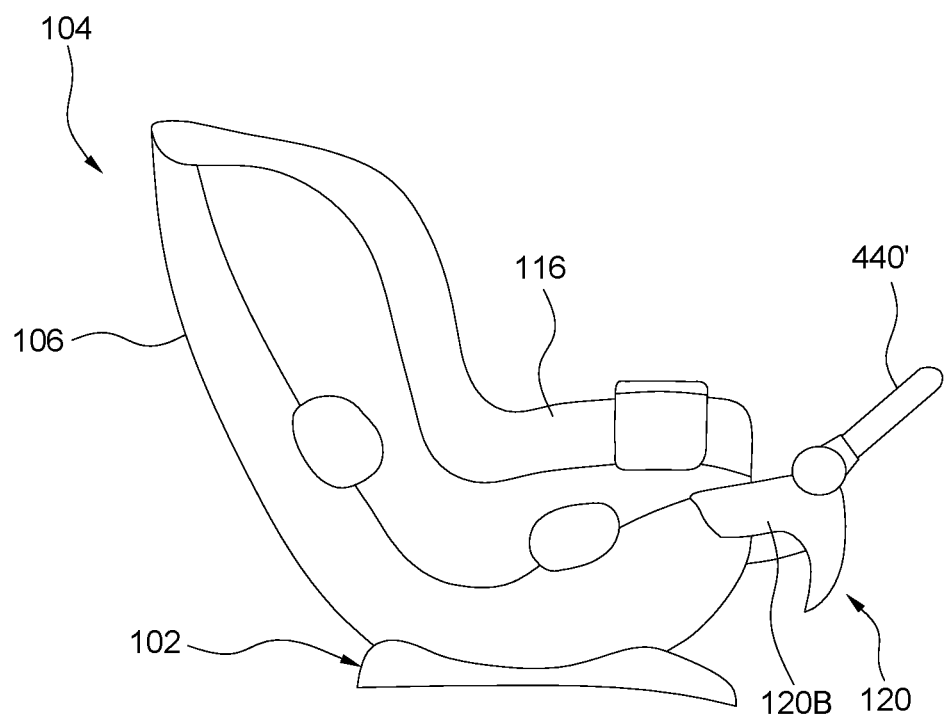
FIG. 16 is a schematic side view illustrating another variant embodiment in which an anti-rebound part is pivotally connected with an extension member in a child safety seat.

FIG. 16 is a schematic side view illustrating another embodiment of an anti-rebound part 440' provided in the child safety seat 100. Instead of the two anti-rebound parts 440 shown in FIG. 15, the child safety seat 100 shown in FIG. 16 can have a single anti-rebound part 440' that is pivotally connected with the two bent portions 120B of the extension member 120. The extension member 120 may be locked with respect to the seat shell 106 with an extension locking mechanism, which may be similar to the extension locking mechanism 122 described previously. Like some embodiments described previously, the anti-rebound part 440' may include a transversal portion, and two side portions respectively connected with the transversal portion at a left and a right side thereof, the two side portions of the anti-rebound part 440' being respectively connected with the two bent portions 120B of the extension member 120. The anti-rebound part 440' thereby formed may have, e.g., a generally U-shape. During operation, the anti-rebound part 440' may rotate between a first angular position corresponding to a stowed position where a distal end of the anti-rebound part 440' is positioned adjacent to the forward end of the extension member 120, and a second angular position tilted at an angle relative to the first angular position that corresponds to a deployed position where the distal end of the anti-rebound part 440' is displaced away from the forward end of the extension member 120. In the second angular position, the anti-rebound part 440' may extend forward and upward from the extension member 120.

Figure 17:
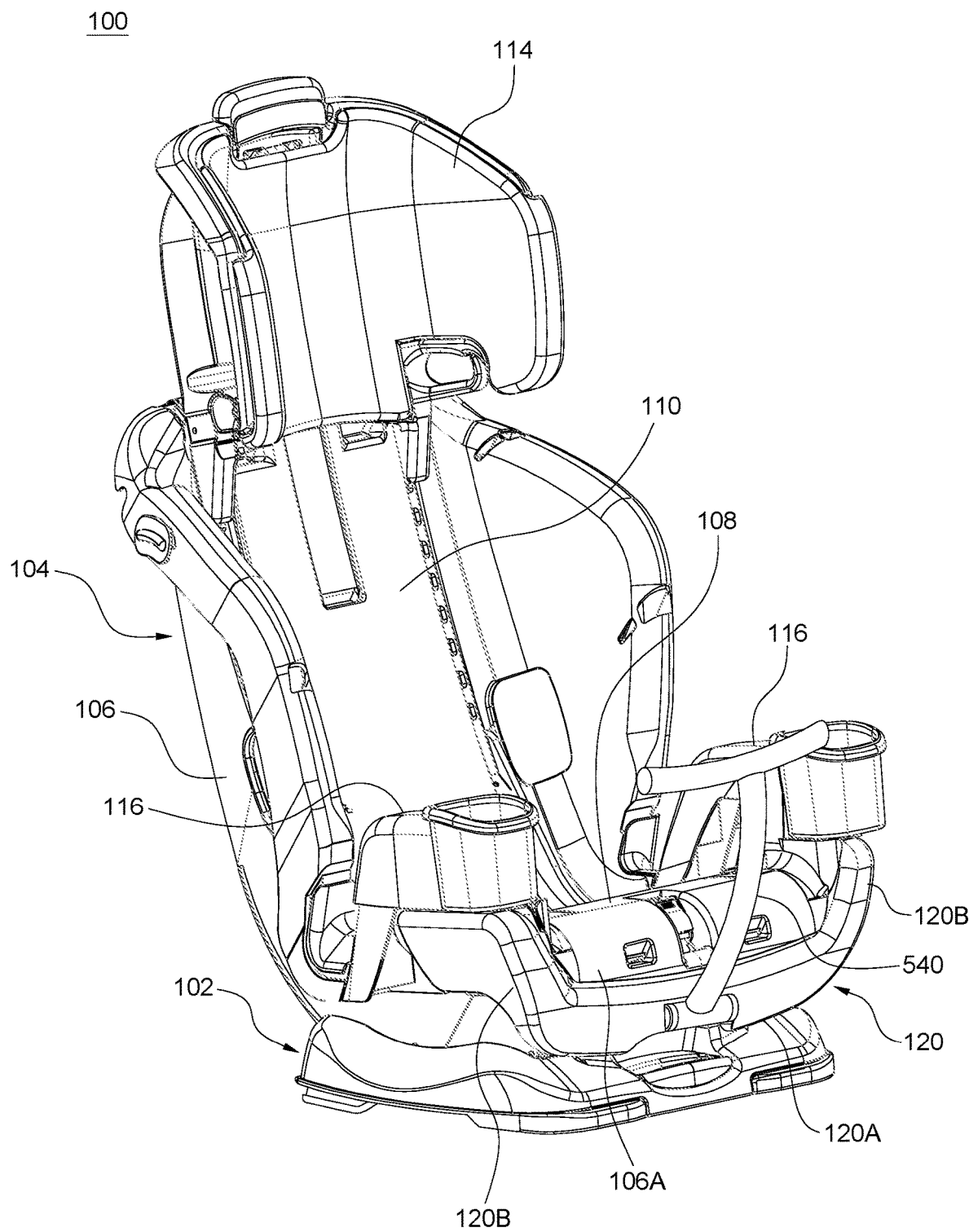
FIG. 17 is a perspective view illustrating another embodiment in which a T-shaped anti-rebound part is connected with an extension member in a child safety seat.

FIG. 17 is a perspective view illustrating another embodiment of an anti-rebound part 540 provided in the child safety seat 100. Referring to FIG. 17, the anti-rebound part 540 can be a T-shaped bar, and can be connected with the transversal portion 120A of the extension member 120 at a middle location thereof. For example, the anti-rebound part 540 may be pivotally connected with the transversal portion 120A of the extension member 120. According to another example of construction, the anti-rebound part 540 may be detachably connected with the transversal portion 120A of the extension member 120. Moreover, the extension member 120 may be locked with respect to the seat shell 106 with an extension locking mechanism, which may be similar to the extension locking mechanism 122 described previously. The child safety seat 100 is installable on a vehicle seat in a rear facing position with the anti-rebound part 540 deployed to extend above the extension member 120 and lie adjacent to a seatback of the vehicle seat. Because the anti-rebound part 540 is provided in the form of a T-shaped bar, access to the seat shell 106 may be facilitated.

Figure 18:
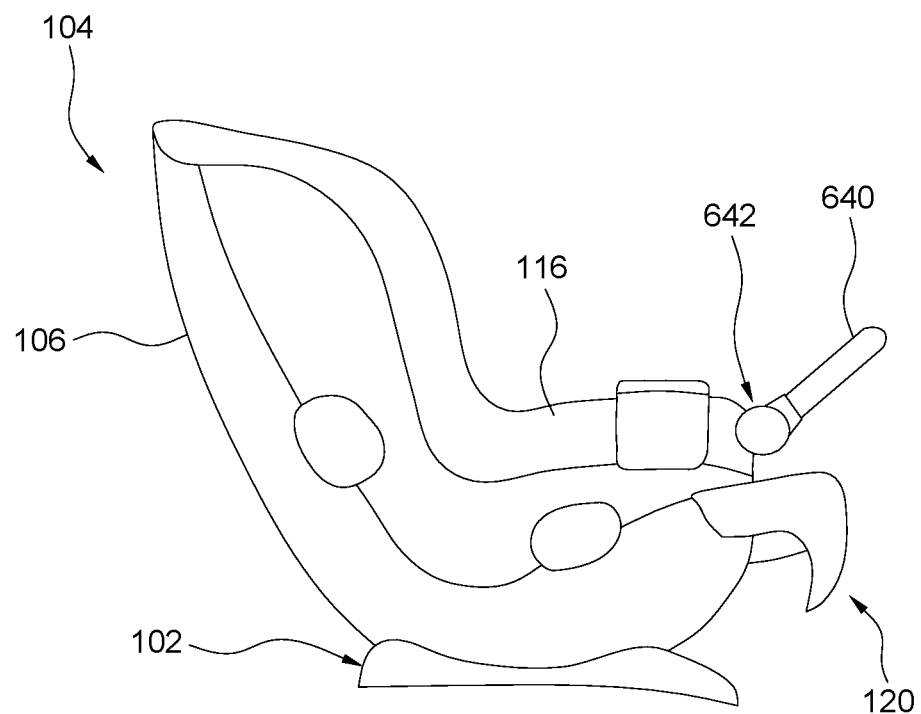
FIG. 18 is a schematic side view illustrating another embodiment of an anti-rebound part provided in a child safety seat.

FIG. 18 is a schematic side view illustrating another embodiment of an anti-rebound part 640 provided in the child safety seat 100. Referring to FIG. 18, the anti-rebound part 640 is mounted on the seat shell 106 rather than on the extension member 120, whereby the extension member 120 and the anti-rebound part 640 are adjustable independent of each other. The extension member 120 may be locked with respect to the seat shell 106 with an extension locking mechanism, which may be similar to the extension locking mechanism 122 described previously. According to an embodiment, the anti-rebound part 640 can be pivotally connected with the seat shell 106, for example adjacent to the front of the lateral guard portions 116. Like previously described, the anti-rebound part 640 may include a transversal portion, and two side portions respectively connected with the transversal portion at a left and a right side thereof, the two side portions of the anti-rebound part 640 being respectively connected pivotally with the seat shell 106 via two pivot connections 642. The anti-rebound part 640 thereby formed may have, e.g., a generally U-shape. When the child safety seat 100 is installed on a vehicle seat in a rear facing position, the anti-rebound part 640 can be positioned to extend at a desirable angle above the extension member 120 and lie adjacent to a seatback of the vehicle seat.

Figure 19:
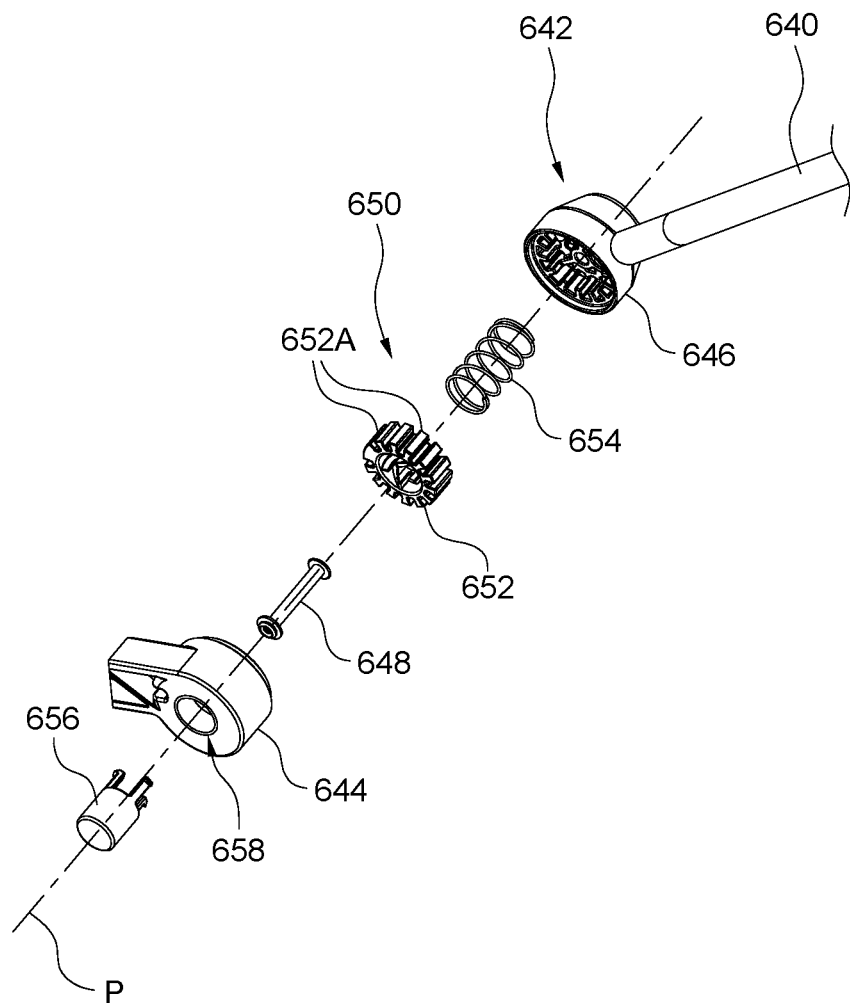
FIG. 19 is an exploded view illustrating further construction details of a pivot connection that couples the anti-rebound part to the seat shell in the embodiment shown in FIG. 18.

In conjunction with FIG. 18, FIG. 19 is an exploded view illustrating further construction details of a pivot connection 642 that couples the anti-rebound part 640 to the seat shell 106 about a pivot axis P. Referring to FIGS. 18 and 19, the pivot connection 642 can include a coupling part 644 that is fixedly connected with the seat shell 106, a coupling part 646 that is fixedly connected with the anti-rebound part 640, and a shaft 648 that pivotally connects the two coupling parts 644 and 646 about the pivot axis P. The coupling parts 644 and 646 can be coupling shells that define an inner cavity for the placement of an anti-rebound locking mechanism 650 operable to lock the anti-rebound part 640 with respect to the seat shell 106.

Referring to FIGS. 18 and 19, the anti-rebound locking mechanism 650 can include a latch 652, a spring 654 and a release actuator 656. The latch 652 can be assembled for sliding movement along the shaft 648. The latch 652 can thereby move along the pivot axis P between a locking position where the latch 652 is engaged with the two coupling parts 644 and 646 to prevent rotation of the anti-rebound part 640 relative to the seat shell 106, and an unlocking position where the latch 652 is disengaged from one of the two coupling parts 644 and 646 for rotation of the anti-rebound part 640 relative to the seat shell 106. For example, the latch 652 may be circumferentially provided with a plurality of teeth 652A, and each of the coupling parts 644 and 646 can include a plurality of corresponding grooves. The teeth 652A of the latch 652 can be respectively engaged with the grooves of the two coupling parts 644 and 646 in the locking position, and can disengage from the grooves of the coupling part 644 in the unlocking position.

It will be appreciated that instead of having the teeth 652A of the latch 652 disengaged from the grooves of the coupling portion 644 in the unlocking position, an alternative embodiment may have the teeth 652A of the latch 652 disengaged from the grooves of the coupling portion 646 in the unlocking position.

Referring to FIG. 19, the spring 654 can have two ends respectively connected with the latch 652 and the coupling part 646. The spring 654 can bias the latch 652 toward the locking position for engagement with the two coupling parts 644 and 646.

The release actuator 656 is provided on one of the two coupling parts 644 and 646, and is operable to urge the latch 652 to move to the unlocking position. For example, the release actuator 656 can be assembled in an opening 658 of the coupling part 644 for sliding movement along the pivot axis P. When the release actuator 656 is depressed, the release actuator 656 can contact with the latch 652 and urge the latch 652 to move against the biasing force of the spring 654 from the locking position to the unlocking position for unlocking the anti-rebound part 640.

Figure 20:
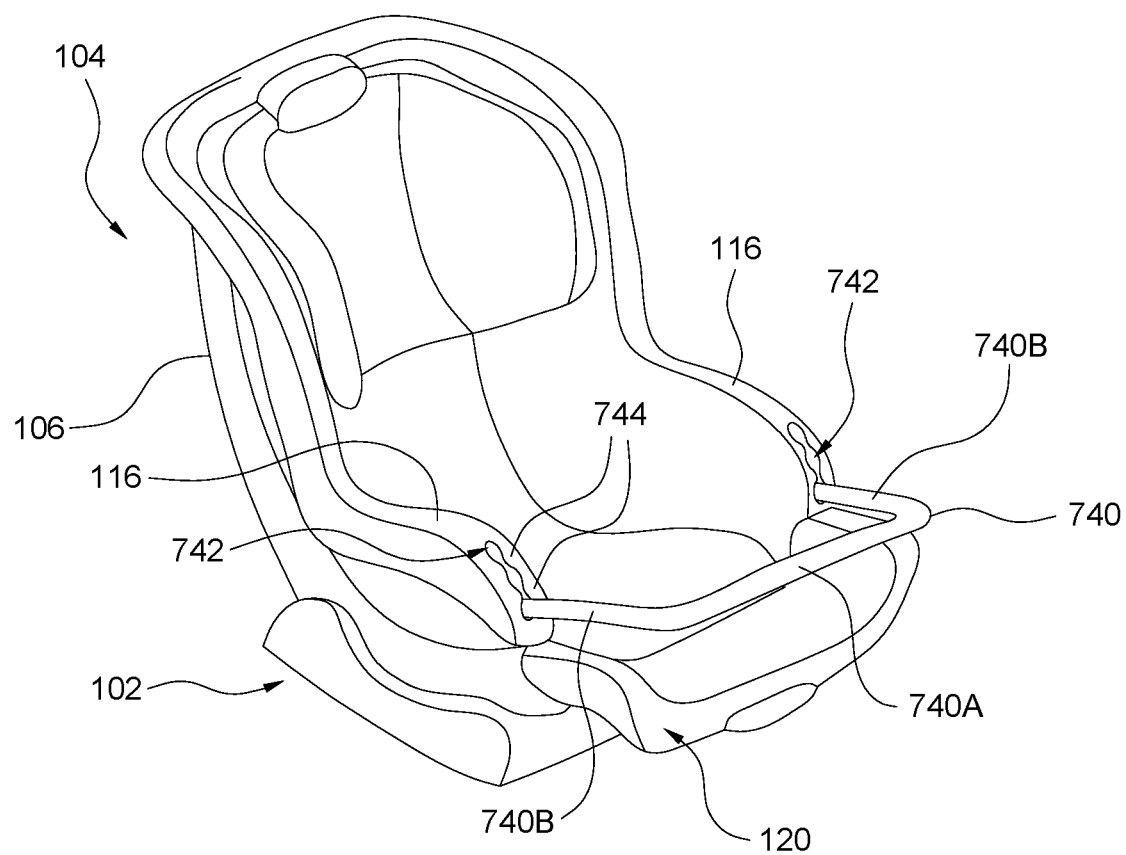
FIG. 20 is a perspective view illustrating another embodiment of an anti-rebound part provided in a child safety seat.

FIG. 20 is a perspective view illustrating another embodiment of an anti-rebound part 740 substitutes for the anti-rebound parts described previously. Referring to FIG. 20, the anti-rebound part 740 can be pivotally connected with the seat shell 106, for example adjacent to the front of the lateral guard portions 116. Like previously described, the anti-rebound part 740 may include a transversal portion 740A, and two side portions 740B respectively connected with the transversal portion 740A at a left and a right side thereof, the two side portions 740B of the anti-rebound part 740 being respectively connected pivotally with the seat shell 106. The anti-rebound part 740 thereby formed may have, e.g., a generally U-shape. Moreover, the extension member 120 may be locked with respect to the seat shell 106 with an extension locking mechanism, which may be similar to the extension locking mechanism 122 described previously. When the child safety seat 100 is installed on a vehicle seat in a rear facing position, the anti-rebound part 740 can be positioned to extend at a desirable angle above the extension member 120 and lie adjacent to a seatback of the vehicle seat.

Referring to FIG. 20, the seat shell 106 can include two channels 742 provided on the front of the two lateral guard portions 116 above the extension member 120, and the two side portions 740B of the anti-rebound part 740 can be respectively disposed through the two channels 742. Each side portion 740B can move upward and downward along the corresponding channel 742 for adjustment of the anti-rebound part 740 between a plurality of angular positions relative to the seat shell 106. Moreover, the seat shell 106 can include a plurality of spaced-apart detents 744 disposed along each channel 742. The detents 744 can be protrusions that locally narrow the channel 742. Each of the detents 744 can be configured to hold the anti-rebound part 740 and prevent its travel from one of the angular positions to another adjacent one of the angular positions.

Figure 21:
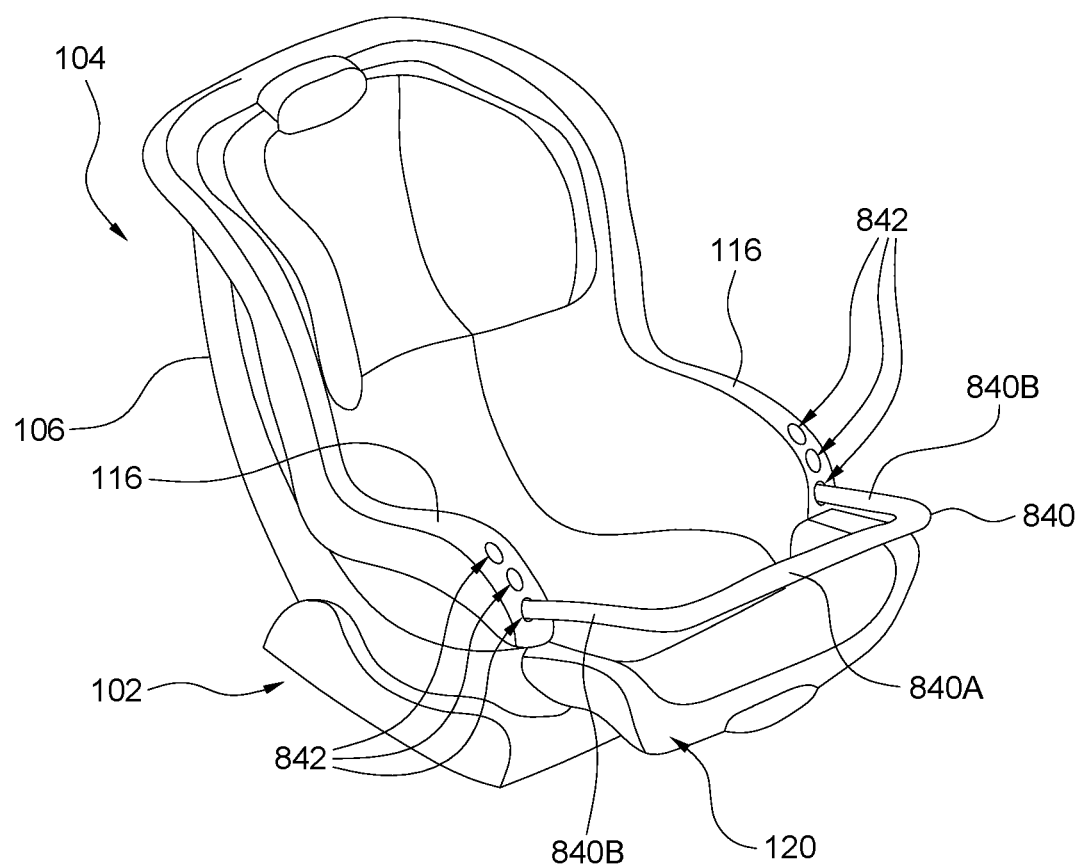
FIG. 21 is a perspective view illustrating another embodiment of a removable anti-rebound part provided in a child safety seat.

FIG. 21 is a perspective view illustrating another embodiment of an anti-rebound part 840 provided in the child safety seat 100. Referring to FIG. 21, the anti-rebound part 840 may include a transversal portion 840A, and two side portions 840B respectively connected with the transversal portion 840A at a left and a right side thereof. The anti-rebound part 840 thereby formed may have, e.g., a generally U-shape. The seat shell 106 can include a plurality of openings 842 corresponding to a plurality of angular positions of the anti-rebound part 840 relative to the seat shell 106, the openings 842 being provided on the front of the two lateral guard portions 116 above the extension member 120. The anti-rebound part 840 can be detachably connected with the seat shell 106 by engaging the side portions 840B with any of the openings 842. When the child safety seat 100 is installed on a vehicle seat in a rear facing position, the anti-rebound part 840 can thus be positioned to extend at a desirable angle above the extension member 120 and lie adjacent to a seatback of the vehicle seat. When it is unused, the anti-rebound part 840 can be removed from the seat shell 106. Like in the previous embodiments, the extension member 120 may be locked with respect to the seat shell 106 with an extension locking mechanism, which may be similar to the extension locking mechanism 122 described previously.

Figure 22:
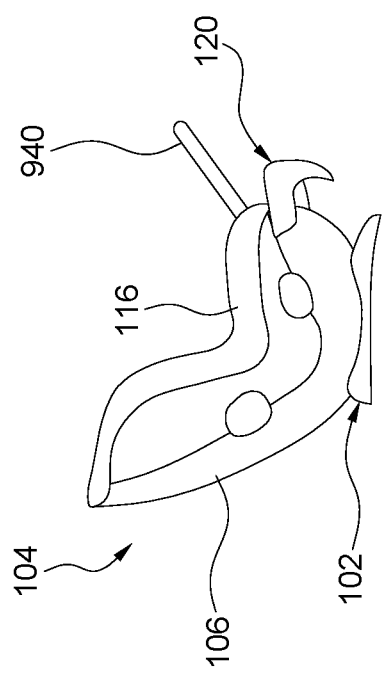
FIGS. 22 and 23 are schematic side views illustrating another embodiment in which an anti-rebound part provided in a child safety seat can have an adjustable length.
Figure 23:
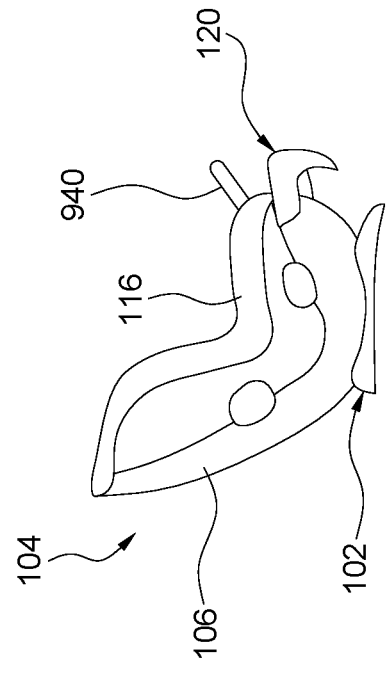

FIGS. 22 and 23 are two schematic side views illustrating a variant embodiment in which an anti-rebound part 940 held at a given angular position relative to the seat shell 106 can have an adjustable length. For example, the anti-rebound part 940 mounted on the seat shell 106 at a same angular position can slide inward or outward relative to the seat shell 106 to modify a length of the anti-rebound part 940 extending outside the seat shell 106. According to another example of construction, the anti-rebound part 940 may have a telescopic structure allowing adjustment of its extending length. When the child safety seat 100 is installed on a vehicle seat in a rear facing position, the anti-rebound part 940 can be thereby adjusted to suitably contact a vehicle seatback. Moreover, the embodiment of FIGS. 22 and 23 can likewise include the extension member 120 operable to adjust a leg room for a child. The extension member 120 may be locked with respect to the seat shell 106 with an extension locking mechanism, which may be similar to the extension locking mechanism 122 described previously.

Advantages of the child safety seats described herein include the ability to provide an extension member allowing adjustment of a leg room for accommodating children of different ages, and an anti-rebound part that can prevent undesirable rotation of the child safety seat when a vehicle collision occurs. The anti-rebound part may be removed and installed as needed, and/or may be adjustable to suitably contact with a vehicle seatback. Accordingly, the child safety seat offers more flexibility and is safer in use.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
a seat shell for receiving a child, the seat shell having a backrest, a front end opposite to the backrest, and a seat portion extending between the backrest and the front end;
an extension member disposed adjacent to the front end of the seat shell and slidably connected with the seat shell, the extension member having a forward end, the extension member being slidable relative to the seat shell to increase or reduce a distance between the forward end of the extension member and the front end of the seat shell;

an extension locking mechanism operable to lock the extension member with respect to the seat shell; and an anti-rebound part carried by the extension member and having a distal end, the child safety seat being installable on a vehicle seat in a rear facing position with the anti-rebound part extending above the extension member and adjacent to a seatback of the vehicle seat, the distal end of the anti-rebound part being positioned adjacent to the forward end of the extension member when the anti-rebound part is stowed in a first angular position relative to the extension member and displaced away from the forward end of the extension member when the anti-rebound part is deployed to a second angular position that is tilted at an angle relative to the first angular position, wherein the extension member includes a guide track, and the anti-rebound part includes a pin guided for sliding along the guide track.

2. The child safety seat according to claim 1, wherein the anti-rebound part is connected with the extension member via a linkage including two bars, each of the two bars being respectively connected pivotally with the extension member and the anti-rebound part.

3. The child safety seat according to claim 2, further including an anti-rebound locking mechanism operable to lock the anti-rebound part with respect to the extension member, wherein the anti-rebound locking mechanism includes a latch connected with the extension member, the latch being movable to engage with a locking structure provided on one of the two bars to lock the anti-rebound part with respect to the extension member.

4. The child safety seat according to claim 1, wherein the guide track includes a first and a second track portion connected with each other, the first track portion having a straight shape and the second track portion having an arcuate shape, a sliding movement of the pin along the first track portion corresponding to a sliding displacement of the anti-rebound part between the first angular position and an intermediate position, and a sliding movement of the pin along the second track portion corresponding to a rotation of the anti-rebound part between the intermediate position and the second angular position.

5. The child safety seat according to claim 1, wherein the anti-rebound part has a telescopic structure.

6. The child safety seat according to claim 1, wherein the anti-rebound part is a paddle pivotally connected with the extension member at a left side thereof, and the child safety seat includes another anti-rebound part in a form of a second paddle pivotally connected with the extension member at a right side thereof, the two paddles being independently rotatable relative to the extension member.

7. The child safety seat according to claim 1, wherein the extension locking mechanism includes a locking part and a release part respectively connected with the extension member, the locking part being movable to engage with the seat shell for locking the extension member in position with respect to the seat shell, the release part being operable to urge the locking part to disengage from the seat shell for unlocking the extension member.

8. A child safety seat comprising:
a seat shell for receiving a child, the seat shell having a backrest, a front end opposite to the backrest, and a seat portion extending between the backrest and the front end;

an extension member disposed adjacent to the front end of the seat shell, the extension member being slidably connected with the seat shell and having a forward end, the extension member being slidable relative to the seat shell to increase or reduce a distance between the forward end of the extension member and the front end of the seat shell;

an extension locking mechanism operable to lock the extension member with respect to the seat shell; and an anti-rebound part connected with the seat shell, the child safety seat being installable on a vehicle seat in a rear facing position with the anti-rebound part extending at an angle above the extension member and adjacent to a seatback of the vehicle seat, wherein the seat shell includes a plurality of openings corresponding to a plurality of angular positions of the anti-rebound part relative to the seat shell, the anti-rebound part being detachably connected with the seat shell by engaging with any of the openings.

9. The child safety seat according to claim 8, wherein the anti-rebound part is pivotally connected with the seat shell.

10. The child safety seat according to claim 9, wherein the seat shell is fixedly connected with a first coupling part, the anti-rebound part is fixedly connected with a second coupling part that is pivotally connected with the first coupling part about a pivot axis, and the child safety seat further includes an anti-rebound locking mechanism operable to lock the anti-rebound part with respect to the seat shell, the anti-rebound locking mechanism including a latch, a spring and a release actuator, the latch being movable along the pivot axis between a locking position where the latch is respectively engaged with the first and second coupling parts and an unlocking position where the latch is disengaged from one of the first and second coupling parts, the spring biasing the latch toward the locking position, and the release actuator being provided on one of the first and second coupling parts and being operable to urge the latch to move to the unlocking position.

11. The child safety seat according to claim 9, wherein the seat shell includes a channel, and a plurality of detents disposed along the channel, the anti-rebound part being movable along the channel for adjustment between a plurality of angular positions relative to the seat shell, and each of the detents being configured to hold the anti-rebound part and prevent its travel from one of the angular positions to another adjacent one of the angular positions.

12. The child safety seat according to claim 8, wherein the anti-rebound part is slidable inward or outward relative to the seat shell to modify a length of the anti-rebound part extending outside of the seat shell.

13. A child safety seat comprising:
a seat shell for receiving a child, the seat shell having a backrest, a front end opposite to the backrest, and a seat portion extending between the backrest and the front end;

an extension member disposed adjacent to the front end of the seat shell, the extension member having a forward end and being movable relative to the seat shell; and an anti-rebound part having a distal end, the child safety seat being installable on a vehicle seat in a rear facing position with the anti-rebound part adjacent to a seatback of the vehicle seat, the anti-rebound part being rotatably connected to the extension member such that the distal end of the anti-rebound part is positioned adjacent to the forward end of the extension member when the anti-rebound part is stowed in a first angular position relative to the extension member and displaced away from the forward end of the extension member when the anti-rebound part is deployed to a second angular position that is tilted at an angle relative to the first angular position, and the anti-rebound part further being slidably connected to the extension member such that the anti-rebound part is slidable relative to the extension member to increase or reduce a distance between the distal end of the anti-rebound part and the front end of the seat shell.

14. The child safety seat according to claim 13, wherein the extension member is slidably connected with the seat shell, the extension member being slidable relative to the seat shell to increase or reduce a distance between the forward end of the extension member and the front end of the seat shell.

15. The child safety seat according to claim 14, further comprising an extension locking mechanism operable to lock the extension member with respect to the seat shell.

16. The child safety seat according to claim 13, further including an anti-rebound locking mechanism operable to lock the anti-rebound part with respect to the extension member, wherein the anti-rebound locking mechanism includes a latch connected with the extension member, the latch being movable to engage with a locking structure provided on one of the two bars to lock the anti-rebound part with respect to the extension member.

17. The child safety seat according to claim 13, wherein the extension member includes a guide track, and the anti-rebound part includes a pin guided for sliding along the guide track.

* * * * *